(12) United States Patent
Salkini

(10) Patent No.: US 10,673,865 B2
(45) Date of Patent: *Jun. 2, 2020

(54) SYSTEMS AND METHODS FOR COMMUNICATION CONTROL IN A RESTRICTED ENVIRONMENT

(71) Applicant: Tecore, Inc., Hanover, MD (US)

(72) Inventor: Jay Salkini, Cocoa, FL (US)

(73) Assignee: TECORE, INC., Hanover, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/666,434

(22) Filed: Oct. 29, 2019

(65) Prior Publication Data

US 2020/0067940 A1 Feb. 27, 2020

Related U.S. Application Data

(60) Continuation of application No. 16/413,594, filed on May 15, 2019, now Pat. No. 10,469,506, which is a
(Continued)

(51) Int. Cl.
*H04W 48/04* (2009.01)
*H04M 17/00* (2006.01)
*H04L 29/06* (2006.01)
*H04W 64/00* (2009.01)
*H04H 20/59* (2008.01)
*H04H 20/38* (2008.01)
(Continued)

(52) U.S. Cl.
CPC ........... *H04L 63/107* (2013.01); *H04H 20/38* (2013.01); *H04H 20/59* (2013.01); *H04J 11/00* (2013.01); *H04J 13/00* (2013.01); *H04L 63/10* (2013.01); *H04L 63/102* (2013.01); *H04W 4/90* (2018.02); *H04W 8/06* (2013.01); *H04W 12/00503* (2019.01); *H04W 12/08* (2013.01); *H04W 48/04* (2013.01); *H04W 60/04* (2013.01); *H04W 64/00* (2013.01); *H04W 72/048* (2013.01); *H04W 88/02* (2013.01); *H04W 16/32* (2013.01); *H04W 76/10* (2018.02); *H04W 76/50* (2018.02); *H04W 84/047* (2013.01); *H04W 88/06* (2013.01); *H04W 88/12* (2013.01)

(58) Field of Classification Search
CPC .............................. H04W 48/04; H04M 17/00
USPC ................................ 455/406, 407; 370/336
See application file for complete search history.

(56) References Cited

U.S. PATENT DOCUMENTS 8,649,760 B2* 2/2014 Salkini .................. H04M 17/00
455/406
9,154,938 B2* 10/2015 Salkini .................. H04M 17/00
(Continued)

*Primary Examiner* — William D Cumming

(57) ABSTRACT

A method for managing wireless device communications including establishing active, persistent, and repetitive communications with a wireless device operating in a coverage area of a local wireless network. In an example, the local wireless network is and overlay to a portion of a macro wireless network. The repetitive communications include placing a call to the wireless device, completing a call connection to the wireless device, sending a message to the wireless device, receiving and processing a response to the message from the wireless device, and persistently repeating a call function of the placing a call, completing a connection, sending a response, and receiving and processing the response until a specified termination event. In an embodiment, the termination event is a power off of the wireless device.

22 Claims, 17 Drawing Sheets

Related U.S. Application Data continuation-in-part of application No. 16/113,195, filed on Aug. 27, 2018, which is a continuation of application No. 15/650,933, filed on Jul. 16, 2017, now Pat. No. 10,063,566, which is a division of application No. 15/094,648, filed on Apr. 8, 2016, now Pat. No. 9,712,539, which is a division of application No. 13/973,244, filed on Aug. 22, 2013, now Pat. No. 9,313,639, which is a division of application No. 13/507,676, filed on Jul. 19, 2012, now Pat. No. 8,825,011.

(51) Int. Cl.

| | | |
|---|---|---|
| *H04J 11/00* | (2006.01) | |
| *H04J 13/00* | (2011.01) | |
| *H04W 12/08* | (2009.01) | |
| *H04W 60/04* | (2009.01) | |
| *H04W 8/06* | (2009.01) | |
| *H04W 72/04* | (2009.01) | |
| *H04W 12/00* | (2009.01) | |
| *H04W 88/02* | (2009.01) | |
| *H04W 4/90* | (2018.01) | |
| *H04W 84/04* | (2009.01) | |
| *H04W 88/12* | (2009.01) | |
| *H04W 88/06* | (2009.01) | |
| *H04W 76/10* | (2018.01) | |
| *H04W 16/32* | (2009.01) | |
| *H04W 76/50* | (2018.01) | |

(56) References Cited

U.S. PATENT DOCUMENTS

| | | | | |
|---|---|---|---|---|
| 9,526,021 | B2* | 12/2016 | Salkini | H04W 48/04 |
| 9,712,539 | B2* | 7/2017 | Salkini | H04L 63/10 |
| 10,063,566 | B2* | 8/2018 | Salkini | H04J 11/00 |
| 10,469,506 | B2* | 11/2019 | Salkini | H04J 13/00 |
| 2014/0120869 | A1* | 5/2014 | Salkini | H04M 17/00 |
| | | | | 455/407 |
| 2016/0198354 | A1* | 7/2016 | Salkini | H04W 48/04 |
| | | | | 370/336 |
| 2016/0227466 | A1* | 8/2016 | Salkini | H04L 63/10 |
| 2017/0055130 | A1* | 2/2017 | LeBlanc | G01C 21/206 |
| 2017/0318028 | A1* | 11/2017 | Salkini | H04L 63/10 |
| 2019/0268350 | A1* | 8/2019 | Salkini | H04L 63/102 |

* cited by examiner

SYSTEMS AND METHODS FOR COMMUNICATION CONTROL IN A RESTRICTED ENVIRONMENT

RELATED APPLICATIONS

This application is a continuation of U.S. patent application Ser. No. 16/413,594, filed May 15, 2019, entitled "Systems and Methods for Communication Control in a Restricted Environment," pending; which is a continuation in part of and claims priority to, U.S. patent application Ser. No. 16/113,195, filed Aug. 27, 2018, entitled "Intelligent Network Access Control," pending; which is a continuation of U.S. patent application Ser. No. 15/650,933, filed Jul. 16, 2017, entitled "Intelligent Network Access Control," now U.S. Pat. No. 10,063,566, issued Aug. 28, 2018; which is a division of, and claims priority to, U.S. patent application Ser. No. 15/094,648, filed Apr. 8, 2016, entitled "Intelligent Network Access Control," now U.S. Pat. No. 9,712,539, issued Jul. 18, 2017; which is a division of U.S. patent application Ser. No. 13/973,244, filed Aug. 22, 2013, entitled "System for Controlling Wireless Devices Access and Method," now U.S. Pat. No. 9,313,639, issued Apr. 12, 2016; which is a division of U.S. patent application Ser. No. 13/507,676, filed Jul. 19, 2012, entitled "Intelligent Network Access Control," now U.S. Pat. No. 8,825,011, issued Sep. 2, 2014. The above-referenced patents and patent applications are incorporated by reference in their entirety.

TECHNICAL FIELD

The technical field is wireless communications.

BACKGROUND

A key performance indicator of any wireless network is its coverage. In addition to providing an evolving set of features to customers, the most successful wireless networks are those that provide ubiquitous coverage and service to as broad a base of subscribers as possible. Because of the emphasis on coverage, these same networks seldom, if ever, provide methods of restricted or controlled access for targeted areas in the network. However, with heightened security concerns, and for other reasons, targeted wireless access restriction may be an important consideration, especially in a localized area, and/or for specific time periods.

SUMMARY

An intelligent network access controller (INAC) creates a local wireless network and dynamically controls access by wireless devices to a macro wireless network underlying the local wireless network. The INAC includes means for registering the wireless devices, wherein the devices are identified and classified, and wherein the devices comprise one of allowed, restricted, and unknown; means for dynamically determining characteristic values of the devices; means for granting access by the devices to the macro network based on the dynamically determined characteristics of the devices; and means for locking devices to the local wireless network based on the dynamically determined characteristics.

The INAC may include a persistence system that, among other functions, permits control of communications in a geographical area by directing active, persistent, and repetitive communications to wireless devices operating (e.g., powered on) in the geographical area. The communications include voice, text, and data communications. The wireless devices include cell phones, smart phones, tablets, and computers configured to send and receive communications. The wireless devices may be identified by EIN, IMSI, MSISDN, and IP addresses. The wireless devices may be known, unknown, or restricted devices. The communications provided by the persistence system may be provided on a regular, periodic basis, an irregular basis, or a continuous or near continuous basis. The communications may be provided until the wireless device powers off, either by human user action or battery discharge. The communications may prevent connection between the wireless device and any other system, network, or device other than those controlled by the INAC. The system may present voice, text, and data communications to a same wireless device. The system may be implemented on a local wireless network generated and controlled by the INAC. Finally, the system may provide mechanisms to allow certain wireless devices to avoid the incoming communications.

DESCRIPTION OF THE DRAWINGS

The detailed description will refer to the following figures in which like numerals refer to like items, and in which.

DETAILED DESCRIPTION

A key performance indicator of any wireless network is its coverage. The most successful wireless networks are those that have ever-expanding coverage, independent of time, to provide ubiquitous service to any and all subscribers and roaming users. Because of the emphasis on coverage, these same networks seldom, if ever, operate so as to restrict access. However, with heightened security concerns, and for other reasons, wireless access restriction may be an important consideration, especially in a localized area, and/or for specific time periods.

Current systems that impose some type of wireless access restriction function may employ jamming equipment to block wireless signals in a particular area. Other systems rely on shutdown of a cell or sector. These current wireless access restriction solutions do not discriminate among users. Instead, these solutions impose a total prohibition on wireless communications. Furthermore, these current solutions are complicated and expensive to invoke. Finally, with these current solutions, if a situation requires that certain personnel (e.g., emergency response personnel) be able to communicate using wireless communications, a secondary communications network must be established since jamming or cell shutdown prohibits all wireless communications for a given wireless technology.

One challenge in trying to restrict wireless access is that in most cases jamming works across a spectrum of radio frequencies and jams the use of the entire frequency spectrum regardless of the wireless technology or technologies deployed in the spectrum. Thus, for jamming to be effective and efficient, a localized communications network must be established with its own technology, unique devices, and spectrum, further complicating the jamming setup and operations.

Another challenge is that in most areas covered by wireless communications there are typically multiple technologies operating in a variety of spectrum ranges. Jamming solutions and cell shutdown are absolute solutions that do not provide the ability to select on a device by device basis the ability to use the wireless communication within the target area.

Figure 1A:
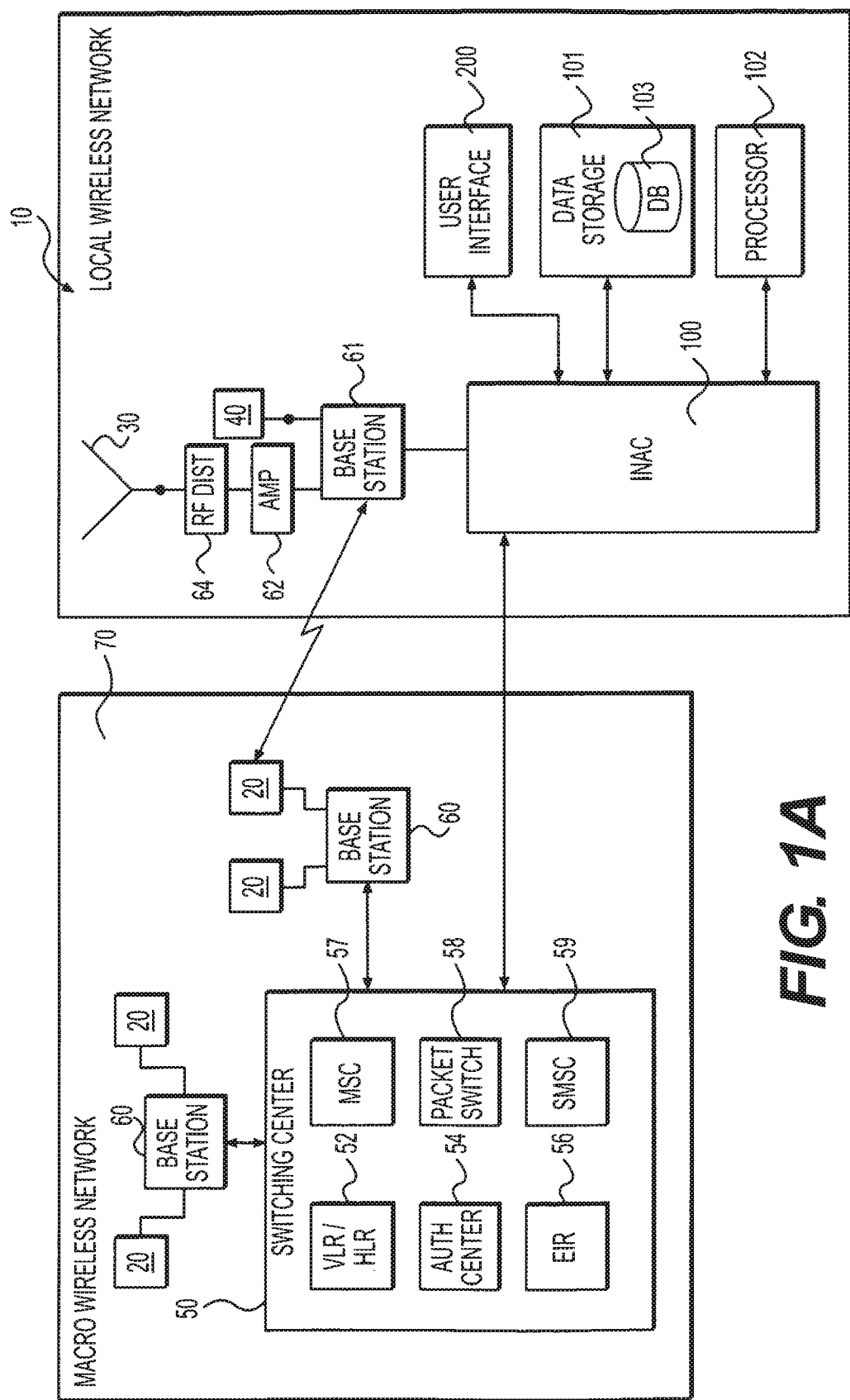
FIG. 1A is a block diagram of a wireless network incorporating an exemplary intelligent network access controller.
Figure 1B:
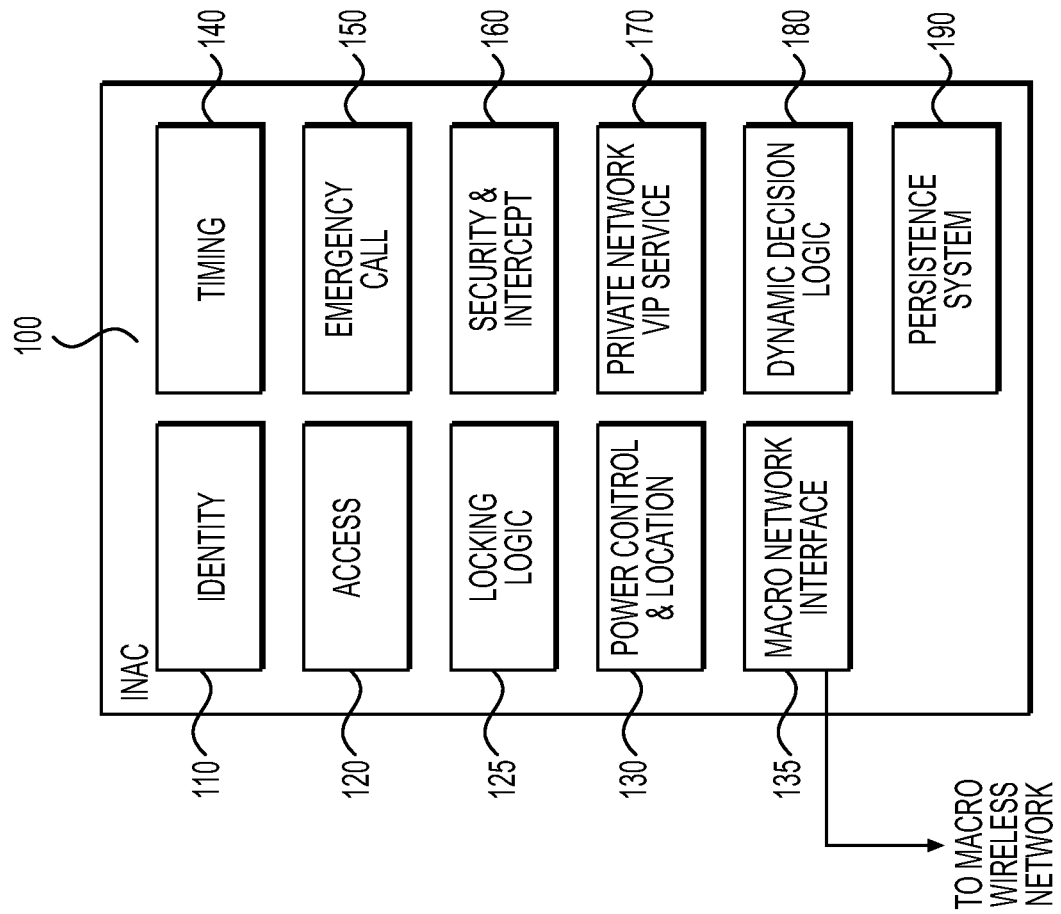
FIG. 1B is a more detailed block diagram of the exemplary intelligent network access controller of FIG. 1A.

To overcome limitations with current art wireless communication access restriction solutions, disclosed herein is an intelligent network access controller, an example of which is shown in FIG. 1B, and accompanying methods, examples of which are shown in flowchart form in FIGS. 7A-8F, that either permanently or temporarily limits allowable communications on an existing wireless macro network or wireless macro networks to only a subset of that network's normal users. Those users not in the subset of allowable users are blocked from access to the wireless macro network when located in a specified area normally covered by the network and/or for a specified time.

The herein disclosed intelligent network access controller, and enabled methods, may direct or attract wireless devices to a coverage area associated with a local wireless network established by the controller. The intelligent network access controller also may redirect wireless devices from an underlying wireless macro network to a local wireless network or may redirect wireless devices from the local wireless network to the underlying wireless macro network.

The intelligent network access controller provides, on a single platform, the necessary components for an end-to-end solution for selective communications restriction across the spectrum of wireless technology, frequency, and access methodology. In an embodiment, wireless users are classified into categories and either allowed to access the wireless networks or are prohibited access, on a subscriber-by-subscriber basis. The intelligent network access controller meets the criteria of service restriction that may be required in specific areas, while allowing selected individuals wireless communications access to wireless networks in those same areas. Thus, the intelligent network access controller eliminates the need to overlay additional communications systems to provide targeted localized wireless communications. The intelligent network access controller implements its service across both commercial as well as private wireless networks.

The intelligent network access controller is particularly useful in certain permanent facilities such as embassies, government facilities, prisons, military installations, stadiums and arenas, hospitals, public transportation facilities, landmarks, and in temporary applications including disaster recovery operations and homeland security operations. In short, the intelligent network access controller can be used in any situation or at any facility or locale to establish a controlled wireless communications environment whereby only selected individuals can access a wireless communications network.

The intelligent network access controller can control a number of different wireless technologies that are in use in the radiofrequency spectrum, including: Global System for Mobile Communications (GSM), General Packet Radio Service (GPRS), Code Division Multiple Access (CDMA), Evolution-Data Optimized (EV-DO), Enhanced Data Rates for GSM Evolution (EDGE), CDMA 2000 1×RTT (one times Radio Transmission Technology), 3GSM, High Speed Packet Access (HSPA), Digital Enhanced Cordless Telecommunications (DECT), Digital AMPS (IS-136/TDMA), and Integrated Digital Enhanced Network (iDEN). Other wireless technologies can be expected, including fourth generation (4G) technologies. First generation (1G) wireless devices were constrained to operate according to the analog APMS technology. Second generation (2G) wireless devices typically operate according to one of GSM, GPRS, EDGE and technologies. Third generation (3G) wireless devices typically employ one of UMTS, WCDMA, HSPA, HSPA+ and EVDO technologies. However, 3G wireless devices also may be able to operate according to a corresponding 2G technology. For example, a 3G UMTS technology wireless device may be capable of operating according to 2G GSM technology. Fourth generation (4G) devices are being developed and deployed, including 4G Long Term Evolution (LTE) and 4G WiMAX.

As used herein, a "device" or "wireless device" may be any wireless access mechanism including wireless handheld devices used for communications such as mobile phones, "smart phones", personal digital assistants, and tablets; laptop computers; or other computing devices that include wireless access technology.

As used herein, a "wireless network" includes a network that provides commercial or private wireless access for voice, text, and or data access. A wireless macro network may employ any number or type of wireless technologies and generally will be a commercial (i.e., publicly-available) wireless network. The intelligent network access controller establishes a local wireless network that exists in some or all of the coverage area of the wireless macro network.

As used herein, technology or wireless technology is the type or designation of the wireless communications mechanism employed by a particular wireless network, such as GSM or CDMA, for example.

FIG. 1A is a block diagram of a wireless communications network that incorporates an exemplary intelligent network access controller and other wireless network components to provide access restriction features. In FIG. 1A, local wireless network 10 is established to operate as an overlay or underlay to a normal, existing, or macro wireless network 70. The local network 10 includes directional antennae 30, repeaters 40, base station(s) 61, amplifier 62, and radio frequency (RF) distribution equipment 64, data store 101 and processor 102, all of which operate in conjunction with intelligent network access controller (INAC) 100 to restrict or to allow wireless communication from and to selected wireless devices 20.

The macro wireless network 70 includes switching center 50 and base stations 60, through which devices 20 establish wireless communications with the macro wireless network 70. The switching center 50 includes standard components that may be found in any switching center, including a VLR and an HLR 52, authentication center 54, equipment identification register 56, a mobile switching center (MSC) 57, a packet switch 58 and a short message service center (SMSC) 59. In an embodiment, multiple macro networks 70, each operating according to a specific wireless technology, may exist in a same coverage area (see FIG. 6). Ordinarily, a subscriber using a device 20 would have that device 20 registered with a macro wireless network 70 once the device 20 was within the coverage area of the macro wireless network 70. However, to restrict or otherwise control access to the macro wireless network 70 on either a temporary or a permanent basis, the INAC 100, and associated interface 200, which facilitates human operator interaction with the INAC 100, may be used to "lock" selected devices 20 to the INAC 100 and thus prevent, limit, or otherwise control access to the macro wireless network 70.

"Locking" wireless devices 20 to the INAC 100 indicates that a wireless device 20 is tuned to and has been accepted by the local signal broadcast of the INAC 100 and the local wireless network 10. In an example, the INAC 100 implements a mimicked signal that follows the signal patterns, parameters, and characteristics of the underlying macro wireless network 70 (or multiple macro wireless networks 70); however, the localized signal is only connected to the INAC 100 and not the macro wireless network 70. The end result is a wireless device 20 that has the appearance, to the wireless device user, of operating on the macro wireless network 70; however, by virtue of the wireless device 20 being tuned ("locked") to the local INAC 100 signal, the wireless device 20 is (except in limited circumstances described later) by default "blocked" from access to the macro wireless network 70 inside the coverage area of the INAC 100 (i.e., inside the local wireless network 10).

The INAC 100 may be implemented as an adjunct to the macro wireless network 70, as an integrated feature within the macro wireless network 70, or, as shown in FIG. 1A, may be implemented as a standalone device that is independent of any specific macro wireless network 70. In any configuration, the INAC 100 is capable of creating its own "local" wireless network (e.g., the local wireless network 10).

The INAC 100 may be implemented as software, hardware, or a combination of hardware and software. The software components of the INAC 100 may be stored as a program on a non-transitory computer readable storage medium such as the data storage 101, and the INAC 100, as a program of machine instructions, may be executed on a suitably programmable processor 102. In addition to storing software components of the INAC 100 (when so implemented), the data storage 101 includes database 103, which stores various data associated with operation of the local wireless network 10, including location registers, device status or classification (allowed, restricted, unknown) and configuration data (phone number, EIN), and other data.

FIG. 1B is a more detailed block diagram of the INAC 100. The INAC 100 includes equipment identity module 110 that receives and stores identifying information associated with devices 20; access module 120 that determines, based on setup or operational mode of the INAC 100, which of the devices 20 are to be allowed access to the macro wireless network 70; locking module 125, which is used to lock a device 20 to the INAC 100 and to provide indications to the locked device 20 that make it appear that the device 20 actually is registered with the macro wireless network 70; power control and location module 130, which operates in conjunction with base station 61, RF distribution equipment 64, amplifiers 62, directional antennae 30, and repeaters 40 to establish the area or volume subject to the access restrictions imposed by the INAC 100, and to locate and optionally track wireless devices 20 in or near the area or volume of the local wireless network 10; macro network interface module 135, which connects the local wireless network 10 with one or more macro, or established, wireless networks 70, and allows communications between the network 10 and the macro networks 70; timing module 140, which may be used to impose temporal limitations on the access restriction functions; emergency access module 150, which operates to allow certain access types (e.g., emergency 911 calls from a wireless device 20) while other access types remain blocked; security and intercept module 160, which provides for monitoring of certain communications locked to the network 10; private network module 170, which operates to create a private wireless network for users of certain devices 20; and dynamic decision logic 180, which provides coordination and control of the functions of the INAC 100, including the ability to dynamically change control features based on changing events and conditions in the area covered by the network 10.

Boundaries (i.e., the coverage area) of the local wireless network 10, and its many sub-elements, can be static (i.e., fixed in place geographically) or dynamic (i.e., changing with time). Thus, for example, an extent of a private wireless network within the local wireless network 10 can be less that the coverage area of the local wireless network, and can be moveable within the local wireless network 10. The boundaries of the local wireless network 10 can extend over two dimensions (i.e., latitude and longitude) to create a coverage area, or over three dimensions (i.e., including altitude) to create a coverage volume. When used hereinafter, volume and area are intended to refer to the same concept, namely the volume or area, depending on the circumstances, subject to control by the INAC 100. As will be explained later, the local wireless network 10 may comprise an effective coverage volume defined by the signal strength of the installed RF equipment. However, the actual coverage volume of the local wireless network 10 (i.e., the volume in which wireless devices 20 may be locked to the INAC 100) may be limited to a volume less than the effective coverage volume.

The identity module 110 serves to determine an identity of a device 20 that is within the coverage area of the local network 10. Such identity may be by means of the device's telephone number or equipment identification number 110, among other means. The module 110 also serves to classify the device 20. For example, a device 20 may have other access limitations embedded, such as a limited number of outgoing call numbers the device 20 can dial, or the device 20 may be limited to calling only 911 or other emergency services. The classification of the device 20 may be used to limit, deny, or allow communication with the macro wireless network 70 while the device 20 is within the coverage area of the local wireless network 10. A device 20 that cannot be identified may be categorized as restricted (see below) and such device 20 would then be locked to the INAC 100 and blocked from access to the macro wireless network 70. The identity module 110 may store the device 20 classification in the database 103 (see FIG. 1A).

Through the access module 120 and the locking module 125, the INAC 100 provides discretionary blocking of access to and from the macro wireless network 70 by devices 20 by recognizing differences among the devices 20. In an embodiment, the INAC 100 recognizes three categories of devices 20: restricted, allowed, and unknown. Restricted devices are those that are identified as belonging to subscribers who are to be denied wireless access (e.g., prisoners, terrorists). Restricted devices are configured by the INAC 100 so as not to be allowed wireless service and access to the macro wireless network 70. Every device 20 has a unique identifying number or characteristic. If the device identifying number or characteristic (e.g., subscriber number) is configured to be "restricted," the INAC 100 accepts that device's access and returns a positive acknowledgement to the device 20. This creates the illusion, at the device 20, that the subscriber has gained access to and is operating within the macro wireless network 70, when, in fact, the device 20 is locked to the INAC 100 until the device 20 is removed from the restricted access area imposed by the INAC 100. By locking the "restricted" device 20 to the INAC 100, all incoming and outgoing accesses by the device 20 may be prevented while the "restricted" device 20 is within the coverage area of the local wireless network 10.

A restricted device category may change dynamically. For example, a device 20 that incorporates a camera may be classified in the restricted category in some local wireless network applications (e.g., an operatic performance where photographs and video are prohibited) but classified as an allowed device in other local networks. Alternatively, a device having a camera may have its data functions locked to the local wireless network 10 but other functions (voice and text) allowed.

Allowed devices are those configured in the INAC 100 as to be allowed wireless service on the macro wireless network 70. After determining the identity of the device 20, and determining that the device 20 is an "allowed" device, the INAC 100 redirects the device 20 from the INAC 100 to the appropriate macro wireless network 70. This redirection forces the "allowed" device to reattempt access on the macro wireless network 70. Once so redirected, the "allowed" device's subscriber can use the device 20 for normal inbound and outbound traffic on the macro wireless network 70.

Unknown devices 20 are those not specifically identified and configured by the INAC 100 as allowed or restricted. Unknown devices 20 may be configured to allow normal wireless network access depending, for example, on a security level requirement at a given location (e.g., for homeland security threat conditions of orange and lower, unknown devices are allowed access to the macro wireless network 70).

Although the devices 20 have been described herein by a classification scheme as allowed, restricted, and unknown, other classification schemes may be employed with the INAC 100.

As noted herein, the INAC 100 may initiate a locking process by compelling a wireless device 20, such as a cellular telephone, to register with the INAC 100 rather than with the macro wireless network 70. However, the INAC 100 need not always send a signal to compel registration. For example, when a wireless device 20 is powered up, it acts as a scanning radio, searching through a list of control channels for the strongest signal. The device 20 re-scans every seven seconds or when the signal strength weakens, regardless of whether a call is placed. The device 20 may search for an identification code assigned to a wireless service provider (e.g., the macro wireless network 70). After selecting a channel, the device 20 identifies itself by sending programmed codes that may identify the device 20, the owner of the device 20, and the device's wireless service provider. In a cellular telephone, these codes may include an EIN, for example. A cell site relays these codes to the mobile telecommunications switching center in a registration process. For example, cellular telephones that are powered on will automatically register or re-register with a cellular tower as the phone travels within the macro wireless network 70. The registration process is the technical means by which the macro wireless network 70 identifies the device 20 and its owner, validates the account and determines where to route call traffic. This exchange occurs on a dedicated control channel that is separate from that used for call content (i.e. audio)—which occurs on a separate dedicated channel. This registration process automatically occurs even while the cell phone is idle. Moving from one coverage area to another may re-trigger the registration process.

As noted above, the INAC 100 may initiate registration on its own by sending a signal to the device 20 causing the device 20 to transmit and identify itself to the INAC 100. The INAC 100 periodically may broadcast signals that compel devices 20 to register with the INAC 100.

Devices 20 that may be in the area of the local wireless network 10 may use different generations of wireless technology and different formats or types of wireless technologies, including second generation (2G) GSM/GPRS/EDGE, and 3G UMTS/WCDMA/HSPA/HSPA+, CDMA 2000 1×RTT, and EDVO. The INAC 100 may use different processes to compel registration when attracting (directing) devices 20 of these different technologies to the local wireless network 10 and redirecting the devices 20 from the local wireless network 10 to the macro wireless network 70, or from the macro wireless network 70 to the local wireless network 10. For example, for 2G GSM/GPRS/EDGE technologies, the INAC 100 may broadcast a coordinated signal to attract compatible devices 20. The INAC 100 establishes appropriate parameters in the coordinated signal to provoke a location update from the device 20. Once it receives the location update from the device 20, the INAC 100 processes an inbound access request from the device 20 and processes the request based on the status (i.e., allowed, unknown, restricted) of the device 20. For example, if the identity module 110 of the INAC 100 determines that the device 20 is restricted or unknown, the INAC 100 may lock the restricted/unknown device 20 to the INAC 100.

For third generation (3G) UMTS/WCDMA/HSPA/HSPA+ wireless technologies, the INAC 100 may operate according to one of at least two processes. In a first process, the INAC 100 uses the parameters and registration processes of the underlying macro wireless network 70. Devices 20 are compelled through broadcast parameters to perform a location update. As with the 2G GSM/GPRS/EDGE process described above, the INAC 100 processes an inbound access request from the device 20 and either locks the device 20 or redirects the device 20 to the macro wireless network 70 based on the classification of the device 20 in the database 103.

In a second process, in an example, the INAC 100 may operate in accordance with the parameters of the underlying macro wireless network 70 without using the standard device access processing of network 70. Specifically, the INAC 100 does not respond to an access request from the device 20. When the device access request to the network 70 is met with a lack of response, the device 20 steps down its operation from the 3G technologies to the lower generation 2G technologies. Once the device 20 has stepped down to the 2G technologies (e.g., GSM/GPRS/EDGE), the INAC 100 processes the device 20 according to this 2G technology. In a second step down example, whereby a device 20 steps down to 2G technology, the INAC 100 sends targeted messaging to the device 20 when the device 20 attempts to access the network 70 in the area controlled by the INAC 100 (i.e., in the area of the local wireless network 10). The targeted messaging instructs the device 20 to step down to the 2G GSM/GPRS/EDGE technology.

The network architecture of U.S. narrowband CDMA systems requires a different approach for attracting devices 20 to the INAC signal. Unlike other commercial technologies where a transition in channels takes place from site to site (as in 2G GSM) or the number of channels is limited to one or two channels (as in 3G UMTS), CDMA 2000 1×RTT networks employ 1.25 MHz channels. Up to eight different channels may be in operation in any spectrum license. Traffic management in a CDMA network is based on maintaining a distribution of users across these multiple frequencies. As devices 20 enter the CDMA 2000 1×RTT network, the devices 20 are assigned an operating channel for the duration of their service in the coverage area until such time as the device 20 leaves the coverage area, is powered off, or is instructed by the network to switch channels. The end result is that the CDMA 2000 1×RTT commercial operator is able to level subscriber traffic across multiple channels and balance the network load accordingly. When the device user is involved in a voice call, text message, or data session, the user completes the entire transaction within the currently assigned frequency.

In situations where the commercial coverage of CDMA extends to areas of an INAC 100 initiated local network 10, devices 20 may be idle on multiple different CDMA channels across the frequency spectrum of the macro wireless network 70. In some situations, the macro network 70 may have up to eight or more channels. The INAC 100 provides a coordinated method for redirecting idle devices 20 from each of the macro wireless network's CDMA channels to a targeted CDMA channel on the INAC local wireless network 10. The redirection is accomplished through the periodic transmission of a targeted message set instructing the idle devices 20 to retune to the specified frequency.

The intelligent network access controller can: broadcast up to eight or more separate frequencies on a single band; operate on any standard CDMA channel in the cell, PCS, or AWS bands; broadcast multiple signals for multiple operators (different SIDs/NIDs); tailor the signaling messaging and pulse rate per channel; generate the Pilot, SYNC, and Paging channels on up to eight or more separate frequencies in a single band; provide the redirect capabilities to send devices to a targeted CDMA channel in the same band; provide the redirect capabilities to send devices to a targeted CDMA channel in an alternate band; provide the redirect capabilities to send devices to a targeted CDMA channel of an alternate macro wireless network; provide the 3G EVDO access control function; provide the capability to coordinated access for outbound voice calls, text messages, and data sessions from allowed devices that are redirected from the INAC CDMA channel to the designated CDMA channel of the macro wireless network.

The above-described method of leveraging a redirection allows for a more efficient handling of devices 20 within the INAC 100 as well as minimizing the impact to CDMA channels of the macro network 70. The end result is that within the coverage area of the local wireless network 10, the CDMA macro wireless network 70 is collapsed from multiple commercial CDMA channels to a single CDMA channel.

When an allowed device 20 attempts to place a call, send a text message, or establish a data session on the macro wireless network 70, the INAC 100 redirects the device 20 from the INAC CDMA channel to a pre-designated CDMA channel of the macro wireless network 70. In order to accommodate this access to the macro wireless network 70, the INAC 100 suspends its transmission on the target CDMA channel on the macro wireless network for a coordinated preset period. After the preset period, the INAC 100 resumes the transmissions on the CDMA channel of the macro wireless network 70. This period allows an allowed device 20 to initiate its transaction on the target CDMA channel of the macro wireless network 70, thus exiting the idle state and allowing a voice call, text message, or data session to be established. When the transaction ends, the allowed device 20 returns to the idle state on the CDMA channel of the macro wireless network 70. Upon receiving a redirect command from the INAC 100 on this channel, the allowed device 20 is redirected back to the INAC CDMA channel.

EVDO as a technology is the 3G compliment to the CDMA 2000 1×RTT 2G system. Unlike the GSM technology where a device 20 is either on 2G GSM or 3G UMTS, the devices 20 using CDMA 2000 1×RTT, EVDO operates within a 1.25 MHZ channel. A typical macro wireless network with this technology may have multiple CDMA 2000 1×RTT channels and one to several EVDO channels deployed. In this situation, to attract devices 20 to the local wireless network 10, the INAC 100 may operate in accordance with the parameters and processes of the macro wireless network 70. The INAC 100 compels devices 20 to register with the INAC 100 by broadcasting parameters that direct the devices 20 to perform a location update. As with the GSM/GPRS/EDGE process, the INAC 100 processes the inbound access request and reacts accordingly based on the configuration of the device 20 in the database 103.

An example access sequence for a device 20 is to acquire the CDMA 2000 1×RTT channel of the local wireless network 10 first, and then proceed to acquire an EVDO channel. For the EVDO and CDMA channels, the INAC 100 broadcasts messaging that makes the channel(s) unavailable to the devices 20 while in the coverage area of the local wireless network 10. By disabling the access to the EDVO service, CDMA devices 20 are only able to access the INAC 100 CDMA 2000 1×RTT channel while in the coverage area of the local wireless network 10.

For 4G LTE, there are two methods by which devices 20 may be compelled to register with the INAC 100. First, devices are compelled through broadcast parameters to perform a location update. As with the GSM process, the INAC 100 processes the inbound access request and reacts accordingly based on the configuration of the device 20 in the database 103.

A second alternative is to operate the device 20 according to the 4G LTE technology but without the standard processing of this technology for device access. When the device access to the system is met with a lack of response, the device 20 steps down in the operation from the 4G LTE level to the 3G level technology, effectively funneling the device 20 to the next lower technology. The 3G technology may be 3G UMTS/WCDMA/HSPA/HSPA+ or may be 3G EVDO depending on the device characterization and the configuration of the macro wireless network 70. The technology step down also can take place from 4G LTE to a 2G technology using a similar method of processing. In this case, the device 20 attempting to access the macro wireless network 70 on 4G LTE finds the INAC signal for 4G LTE and steps down to a 2G signal. Once on 2G, the device 20 is processed as a 2G device. The 2G technology can be 2G GSM/GPRS/EDGE or 2G CDMA 2000 1×RTT depending on the device characterization and wireless network configuration. In either case for the 4G to 3G step down or the 4G to 2G step down, these scenarios also can be accomplished through targeted messaging sent to the device when they access the network. The messaging instructs the device 20 to step down to the next level of technology.

For the 4G WiMAX technology, there are two methods by which devices 20 may be compelled to register with the INAC 100. First, devices 20 are compelled through broadcast parameters to perform a location update. As with the GSM/GPRS/EDGE process, the INAC 100 processes the inbound access request and reacts accordingly based on the characterization of the device 20 in the database 103. A second alternative is to operate the device 20 in accordance with the 4G WiMAX technology without providing the standard processing of the device access request. When the device access is met with a lack of response, the device 20 steps down in operation from the 4G WiMAX level to the 3G level technology, which effectively funnels the device 20 to the next lower generation technology. The 3G technology may be 3G UMTS/WCDMA/HSPA/HSPA+ or may be 3G EVDO. The technology step down also can take place from 4G WiMAX to 2G using a similar method of processing in which the device 20 accessing the wireless network 70 on 4G WiMAX finds the INAC 100 signal for WiMAX and then steps down to the 2G signal. Once on 2G, the device 20 is processed as a 2G device. The 2G technology can be either 2G GSM/GPRS/EDGE or 2G CDMA 2000 1×RTT. In either the 4G to 3G step down or the 4G to 2G step down, the step down also can be accomplished through targeted messaging sent to the device 20 when the device 20 attempts to access the macro wireless network 70. The messaging instructs the device 20 to step down to the next technology level.

As noted above, the INAC 100 operates to create a local overlay or underlay of the same frequency spectrum and configuration as the macro wireless network 70. That is, the INAC 100 mimics the macro wireless network 70 in the coverage area of the local wireless network 10. The area of restricted access (i.e., the coverage area of the local wireless network 10) can extend to any part of the coverage area of the macro wireless network 70, and such restricted access area may be enforced by the use of the power control and location module 130, directional antennae 30, and repeaters 40. The directional antennae 30, repeaters 40, as well as the base stations 60, amplifiers 62, and RF distribution equipment 64 may all be located outdoors, all be located indoors, or be located in any combination between indoors and outdoors. Thus, the restricted area under control of the INAC 100 may be limited to a building, a sports stadium, or a geographical area, for example. Furthermore, although the coverage area of the local wireless network 10 ordinarily might extend beyond the boundaries of the building, sports stadium, or geographical area, by imposing boundary constraints, as described below, the enforced coverage area of the local wireless network may match precisely the extent of the actual boundaries of the building, sports stadium, or geographical area.

The area of restricted wireless access is not necessarily static, and can be changed based on set criteria, variable (dynamically changing) criteria, or at the discretion of a network operator. The end result is a targeted coverage area that can provide controlled and deterministic wireless communications access by subscribers. Once a restricted or an unknown device 20 leaves the restricted access area, the subscriber's device 20 re-registers with the macro wireless network 70 and is no longer controlled (locked) to the INAC 100.

The power control and location module 130 includes the processing component algorithms and databases (a device location sub-module, not shown in FIG. 1B) needed to determine the location of a device 20 relative to the coverage area imposed by INAC 100 (i.e., the local wireless network 10 coverage area). The module 130 may determine device location based on a GPS signal provided in conjunction with operation of the device 20. For example, the device 20 may query a GPS satellite to obtain geographic location information. The GPS-provided information may be used to both initially locate the wireless device 20, and subsequently to track the wireless device 20. The wireless device 20 also may be tracked by a dead reckoning process. When locked to the INAC 100, the same query from the device 20 may cause the location information to be provided to the module 130. The module 130 also may take advantage of location information provided by components of the macro wireless network 70, by local network 10-dedicated cell detection components, or by a process of database correlation to geo-locate the device 20. For example, using triangulation mechanisms, two or more receiving units of the networks 10 or 70 may measure radiated power (signal strength) from the device 20, send the signals to the INAC 100, where the module 130 computes circular location information and determines a point of intercept that corresponds to the location of the device 20. The module 130 can implement other triangulation techniques and similar processes may be used for other signals. The module 130 also may determine altitude of the device 20, in addition to latitude and longitude. One means for determining altitude is by computing slant range based on angle of arrival information. Another altitude measurement technique involves proximity to equipment of the networks 10 or 70 that are at a known altitude. Well-known location information mechanisms also may be incorporated into the module 130.

The module 130 may rely on using voice recognition to determine the position location of a device 20.

The module 130 may rely on covertly activating a device 20 to determine its location. This activation may include the use of a camera or microphone of a device 20 to gather information about the device 20 position location.

The module 130 may rely on the underlying macro wireless network 70 for position location of a device 20. For example, once a device 20 is identified as within the RF coverage area created by the INAC 100, the module 130, in conjunction with the module 135, may send a short message to corresponding equipment in the macro wireless network 70. That equipment has the geographic location of the device 20, and can continue to track the location of the device 20. The device location equipment of the macro wireless network 70 then can send the geographic location of the device 20 to the module 130, and can update the location as the device 20 is moved within the coverage area of the local wireless network 10.

The module 130 also may determine device location based on database correlation techniques. For example, each point (location defined with some degree of granularity) in the coverage area of the local wireless network 10 may have associated location characteristics, and a database of those characteristics may be incorporated into the module 130, along with algorithms to recognize and process the characteristics data. Upon receiving such characteristics data associated with a specific device, the module consults the characteristics database to see if the received characteristics correspond to any of the defined points in the coverage area. These characteristics include signal strength of the device 20, measured angle of arrival of a signal, intercept by one specific wi-fi point, time of entry within the RF coverage area of the local wireless network 10, and other characteristics.

Once the module 130 determines location (x, y, z (optional)) of the device 20, that location can be compared to the intended boundaries of the local wireless network 10, and if the device 20 is within the boundaries, the device 20 either can be denied full access, given some form of restricted access, or given full access to the macro wireless network 70.

When the subscriber's wireless device 20 is locked to the INAC 100, the locking module 125, in an embodiment, operates to ensure that the device's display and apparent operation are the same as if the device 20 were registered with the macro wireless network 70. In an embodiment, a subscriber who attempts to use a device 20 locked to the INAC 100 will see a failed access attempt, or similar warning. The subscriber's perception then likely would be that the device 20 was not receiving sufficient signal strength to enable wireless communications or the serving wireless network did not have the requisite capacity to service the access request. This further masks the purpose and operation of the INAC 100. Only after a repeated pattern of access denial is established would the typical subscriber discern the restricted access.

In another embodiment, certain subscribers may be allowed to place calls under control of the INAC 100. For example, and as will be described later, the security and intercept module 160 may be used to monitor and locally record certain conversations from devices 20 within the coverage area of the local wireless network 10.

The macro network module 135 operates to connect the INAC 100 to corresponding control equipment of the macro wireless network 70, and to communicate (send messages) between networks 10 and 70. The module 135 also may be used in connection with the security & intercept module 160 to monitor and record communications from selected devices 20 using equipment of the macro wireless network 70.

The timing module 140 may be programmed for, or may generate signals to limit access of devices 20 based on time of day, day of week, specific dates, or any event for which a time base can be established. Time may be determined based on defined start and stop times/days, or by a start time/day and a duration.

Figure 3:
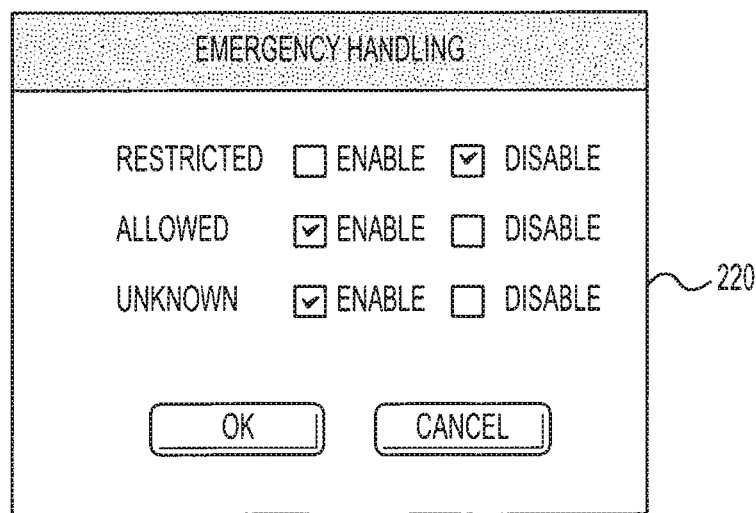
FIG. 3 illustrates an exemplary interface for enabling emergency access.

The emergency call module 150 can be used to grant limited exceptions to access restrictions otherwise imposed on the local wireless network 10. For example, in an embodiment, an otherwise restricted device 20 may be allowed to make a 911 or emergency call. The module 150 includes the programming needed to recognize such an emergency call, and, based on pre-established rules, either allow or disallow the call. For example, depending on the type of installation and the security requirements, emergency call access may need to be available, and thus may be enabled or disabled. Emergency call access can be configured based on the classification of each device 20: restricted, allowed, or unknown. FIG. 3 is an interface 220 that allows a system operator to enable or disable emergency access for each of the three subscriber device classifications (restricted, allowed, and unknown). In an embodiment, when emergency call access is enabled, the emergency access module 150 of the INAC 100 allows a device 20 to be redirected to the macro wireless network 70 when that device 20 dials an emergency call access number such as 911. Upon completion of the emergency call access, the device 20 returns to a locked to INAC condition, as appropriate. When emergency call access is disabled, the INAC 100 ignores all call access requests from subscribers whose devices 20 are locked to the INAC 100.

As an alternative to the emergency call access redirection process described above, the INAC 100 may provide local handling of an emergency (911) call access without redirecting the device 20 to the macro wireless network 70 (see FIG. 1A). In this example, the INAC 100 recognizes the emergency call access from the device 20 as a 911 call, and instead of initiating redirection to the macro wireless network 70, processes the 911 call locally on the local wireless network 10, providing call routing to the appropriate emergency destination. The emergency destination may be a Public Safety Access Point (PSAP) or an alternative destination as configured on the INAC 100. The emergency destination may be reached by way of a direct connection with the INAC 100 or indirectly by way of another telecommunications network. The connection from the INAC 100 to the destination of the 911 call may be provided over a circuit switched or packet switched connection.

Returning to FIG. 1B, the INAC 100 may include the optional security and intercept module 160 that is used for lawful intercept of wireless communications using a direct Internet connection (or other available connection type) to a monitoring station. When enabled at the INAC 100, the security and intercept module 160 allows law enforcement personnel to monitor and record conversations and data transfers (packet and circuit), call signaling messages, accessed features, and SMS originated or terminated messages for targeted wireless devices that are currently locked to the INAC 100 and allowed localized services on the INAC 100 system.

When the INAC 100 operates to restrict wireless communications by way of a wireless network, there still may be a need to provide some form of private network communications in the wireless access limited area of the local wireless network 10. To provide this additional functionality, the INAC 100 may include the private network module 170, which allows for limited wireless voice communications using either a commercially available technology such as GSM or CDMA, or voice over IP (VoIP) technology, including session initiated protocol/unlicensed mobile access (SIP/UMA). As additional wireless technologies become viable, these can be added to the private network as well. The private network module 170 also allows for connection to a PBX or PSTN.

The INAC 100 can be configured to provide various levels of access depending on the configuration of the subscriber devices 20 and the level of security required for the access. Under control of the dynamic decision logic module 180, the INAC's operational mode may be changed dynamically, either automatically, or manually. The module 180 considers inputs from other modules of the INAC 100 and processes these inputs to arrive at an operational mode configuration. Automatic changes may be programmed using the interface 200. Examples of automatic changes are changes programmed into the INAC 100 based on time of day, day of week, or some other calendar-based criteria; the occurrence of a specific event (e.g., a concert); changes in threat levels (e.g., homeland security threat conditions-yellow, orange, etc.); and changes in an operational profile or physical location (of the INAC 100 or of the wireless device 20) (e.g., an aircraft descending below 10,000 feet, a ship entering port, a train arriving at a station). In addition, the module 180 dynamically resolves conflicts between inputs from the other INAC 100 modules. For example, the access module 120 may allow access at a specific location while the power control and location module 130 disallows access. Any such conflicts are resolved by the module 180. One such means for conflict resolution is to prioritize inputs from the various modules so that the competing module with the highest priority always wins.

The INAC 100 may be programmed with dynamic trigger points that change a mode of operation of the INAC 100 with respect to all devices 20, a specific class of devices 20, or a specific (individual) device 20. For example, if the INAC 100 detects an influx of 1,000 pre-paid devices 20 within the local wireless network 10 over a given period, the INAC 10 may block any further pre-paid devices 20, and/or may block any or all of the initial 1,000 pre-paid devices. In another example, if an otherwise restricted device 20 is used to attempt a call to one specific number a number of times (e.g., 10) within a period, that device may be unlocked from the INAC 100 and passed to the macro wireless network 70, but the ensuing conversation, text, or data are recorded or monitored.

Manual changes may be implemented directly by a system operator by using the interface 200. For any of the modes of operation, the INAC 100 provides a logging mechanism to track all system access attempts and the resulting status. Additionally, the INAC 100 provides, with the database 103 (see FIG. 1A) the capability to view the existing database information including the allowed and restricted lists, system configuration, system statistics, and log of system activity.

Figure 2:
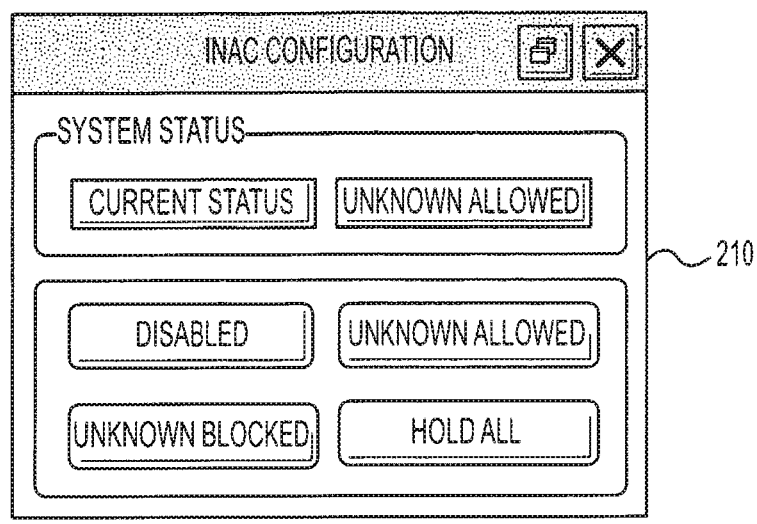
FIG. 2 illustrates an exemplary interface for enabling wireless access restrictions using the controller of FIG. 1B.

The INAC's operational modes include disabled, wherein the access restrictions imposable by the INAC 100 are suspended; hold all, or virtual jam, wherein all wireless communications are processed as locked to the INAC 100; unknown allowed, wherein only known "restricted" devices are locked to the INAC 100; and unknown blocked, in which both restricted and unknown devices are locked to the INAC 100. FIG. 2 illustrates an exemplary interface 210 produced by the interface 200 and the INAC 100 for enabling wireless access restrictions. Additionally, the INAC 100 also can operate in a passive mode where all subscriber access is redirected to the appropriate macro wireless network 70.

As subscribers access the INAC 100, and either are locked to the INAC 100 or redirected to the macro wireless network 70, the INAC 100 captures access information that can be used to generate access reports for each type of device 20 (i.e., unknown, allowed, restricted). The reports provide an organized analysis as to which users are accessing the system, including time period, call duration, and frequency of use. The reports also provide useful information for establishing system databases and use of the INAC 100. The reports may be stored in the database 103 (see FIG. 1A).

The INAC 100 provides for location sensitive operations, an example of which, as noted above, involves an aircraft. The INAC 100 may be installed on an aircraft so that certain devices (e.g., those of crew members) may be used for wireless communications at any time. Alternatively, the INAC 100 may be used to control access to wireless communications based on the aircraft's location (latitude, longitude, and altitude) or any aspect or aircraft operation There are many possible deployment options for the INAC 100. For example, the INAC 100 may be implemented as a permanent part of the macro wireless network 70.

The INAC 100 also may be implemented as a standalone device that overlays one or more wireless communications networks so that all wireless communications in a specific location are capable of some form of access restriction. One example of this wireless feature is to establish an INAC 100 at a building, a facility, or a campus.

Figure 4:
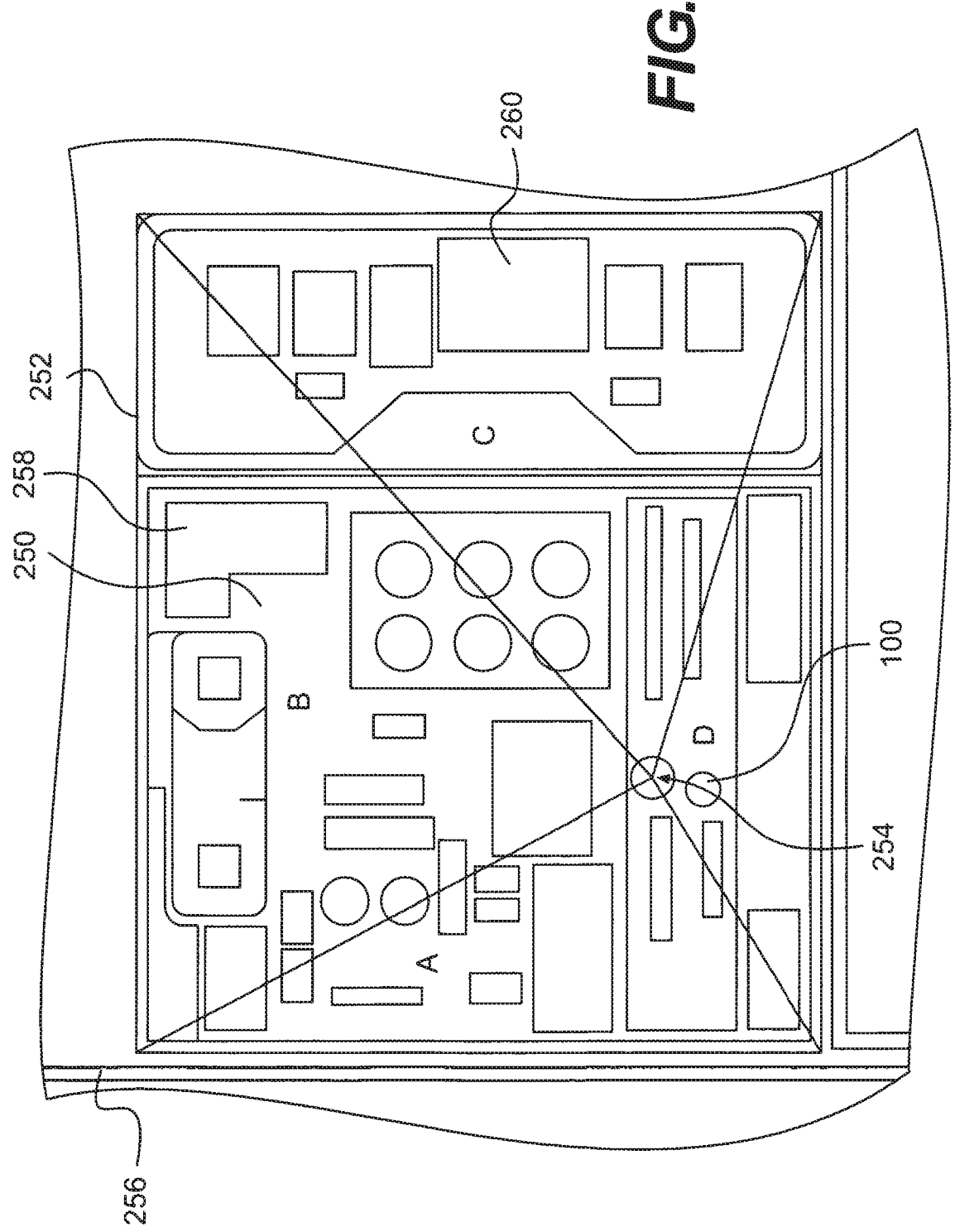
FIG. 4 illustrates a specific implementation of the controller of FIG. 1B.

A specific implementation of the INAC 100 is to control (e.g., block) wireless communications among a prison population while at the same time allowing prison guards and staff to use the underlying macro wireless network 70. This implementation is illustrated in FIG. 4, wherein a prison facility 250 is defined by perimeter 252. Installed within the perimeter 252 is INAC 100, and corresponding transmission equipment 254, which includes a base station, amplifier, RF distribution module, and one or more antennas. The antennas may be directional, and serve to define a number of sectors A-D as shown. Adjacent to the perimeter 252 is a road 256 over which everyday traffic may pass. Users inside the perimeter 252 with unauthorized devices 20 have their devices locked to the INAC 100. The precise boundary (i.e., the perimeter 252) of the prison facility is known and stored with the INAC 100. Any authorized device 20 located within the perimeter 252 may be passed to the underlying macro wireless network 70, after verification by the INAC 100. Unauthorized devices 20 ordinarily are locked to the INAC 100, but may be passed to the macro wireless network 70 and the ensuing conversation, text, or data may be recorded. Because the coverage area established by the INAC 100 may "overlap" the perimeter, devices 20 outside the boundary may initially lock to the INAC 100. After verification that such a device is not restricted, the device 20 may be redirected to the macro wireless network 70.

The installation of the local wireless network 10 at the prison 250 may be at a finer-grained level than simply the prison boundary 252. For example, a cell block 260 may be designated as the only restricted access area for wireless devices 20, such that any wireless device 20 brought into the cell block 260 is locked to the INAC 100. Alternatively, only unknown and restricted wireless devices within the precise boundaries of the cell block 260 are locked to the INAC 100. In another embodiment, the local wireless network 10 can be set-up to cover all of the area (x, y, z) within the boundaries of the prison 250, except the precise boundaries of administration building 258, where access to the underlying macro wireless network 70 is permitted. Finally, the level of access to the macro wireless network 70 may vary from one sector (A-D) to another in the prison 250.

Thus, by using the precise two- or three-dimensional boundary data for a specific building, facility, or geographic location, locking a wireless device 20 to the INAC 100 may be accomplished at virtually any level of granularity. For example, wireless devices 20 may be locked to the INAC 100 when brought into a room in an office building, into a cell block in a prison, or onto a mobile platform, such as an airplane, while other wireless devices 20 outside the room, cell block, or airplane, are connected to the macro wireless network 70.

Installation of the INAC 100 as part of a network, or as a standalone device can be permanent or temporary. For example, the INAC 100 may be available as a mobile device, along with the necessary amplifiers, RF distribution, antennae and repeaters, so that a disaster recovery operation may invoke wireless access restrictions in the area where the disaster recovery is taking place. Upon completion of the disaster recovery operations, the access limitation area is disestablished.

The INAC 100 may also provide the capability to individually access the locked wireless devices 20 overtly or covertly thus allowing the exchange of information or enabling the ability to provoke action from the wireless device. For example, devices 20 locked to the INAC 100, as noted above, may be queried to determine their geographical (GPS) location. Other devices 20 may be turned on so as to monitor conversations capable of detection by the device's microphone.

The INAC 100 may include other communication control systems and mechanisms, and may enable other communication control methods. Returning to FIG. 1B, the INAC 100 may incorporate a persistent annoyance system, which is shown as a separate persistence system 190 for illustration and ease of description. In some implementations of the INAC 100, the persistence system 190 may execute to shut-off certain wireless devices 20 in restricted environments or more generally, in the coverage area of a local wireless network (see examples in FIGS. 4-6) generated by the INAC 100. For example, the system 190 may be used to prevent the effective use of a contraband cell phone or any other contraband wireless communications device in a prison. In an embodiment, once the INAC 100 has operated to identify a wireless device 20 such as a cell phone in a given geographical area over which the INAC 100 has implemented the local wireless network, the system 190 may establish a data communication link with the wireless device 20, and may maintain the link until the wireless device 20 is powered off or until an operator of the wireless device 20 has taken a specific action to gain limited or full access using the wireless device 20. As a further example, once a wireless device 20 has been brought into the coverage area of a local wireless network established by operation of the INAC 100, the wireless device 20 may be compelled to register with the INAC 100. Such wireless device 20 then may be identified as allowed, unknown, or restricted (or similar categories of devices)—see FIG. 2. In an aspect, only restricted and unknown wireless devices 20 may be subject to operation of the system 190. In another aspect, any wireless device 20 within the coverage area of the local wireless network, at least initially, may be subject to operation of the system 190.

In an embodiment, the persistence system 190 may execute to provide active, persistent, and repetitive "calls" to a wireless device 20 operating in local wireless network 10. The "calls" may be voice, text (e.g., SMS), or data, and the "calls" may overload the wireless device 20 and in so doing, annoy the human user operating the wireless device 20 such that the user may seek to eliminate the "calls" or simply may power off or abandon the wireless device 20. Following are capabilities of the persistence system 190:

- Configure a wireless device as a recipient of inbound traffic
- Automate the placement of inbound voice calls to a device
- Automate the transmission of text messages to a device
- Automate a data connection to a device
- Program the contents of the voice message, text messages, and or data connections presented to the device
- Configure the frequency and the activity period for the initiation of the voice calls, text messages, and data connections Since the wireless device 20 is controlled through the local wireless network 10, features such as call forward unconditional can be overridden (thereby allowing the inbound calls to be sent to the wireless device 20). Table 1 following illustrates configurable parameters of the persistence system 190:

TABLE 1

Persistence System Configurable Parameters

| Parameter | Description |
| --- | --- |
| Device Identity | The identity of the device. This may be an IMSI or MSISDN (phone number), or IP address |
| Voice Call | Selection to enable the ability to initiate voice calls to the selected device |
| Voice Call Rate | The number of calls per hour to initiate to the device |
| Voice Call Pattern | Determines whether the frequency of the call initiation is evenly distributed over the hour or randomly generated |
| Voice Call Activation | A 24-hour mapping of the activity period for voice call initiation |
| SMS | Selection to enable the ability to initiate short messages to the selected device |
| SMS Rate | The number of short messages per hour to initiate to the device |
| SMS Pattern | Determines whether the frequency of the SMS initiation is evenly distributed over the hour or randomly generated |
| SMS Activation | A 24-hour mapping of the activity period for SMS initiation |
| SMS Content | The content of the SMS to send to the device |
| Data | Selection to enable the ability to initiate data connections to the selected device |
| Data Connection Rate | The number of data connections initiated per hour to the device |
| Data Pattern | Determines whether the frequency of the Data Connection initiation is evenly distributed over the hour or randomly generated |
| Data Activation | A 24-hour mapping of the activity period for Data connection initiation |
| Data File | The data file to stream to the device once the connection is established |

In addition to the above-disclosed functions and structures, the INAC 100 also may be used to enable (and thus control) wireless communications in the RF coverage area of the local wireless network 10. For example, a theme park may establish a local wireless network 10 using the INAC 100. The theme park may provide its own devices 20 to theme park customers, and permit certain wireless communications within the theme park using the theme park-owned devices. The communications may be used by one family member to track another family member, to provide news updates to customers with the theme park-owned devices, and for other purposes. In this implementation of the INAC 100, the existing macro wireless network 70 may continue to function, and the user-owned devices 20 would communicate as normal over the macro wireless network 70.

Another implementation of the INAC 100 to provide wireless communications involves establishing a VIP service to local customers. In this implementation, the INAC 100 serves VIP customers (using those customers' normal devices 20) and directs all other customers to the underlying macro wireless network 70. This VIP service can be used in virtually any location or situation, including at prisons to provide a communications network for guards and other staff, at embassies to provide secure wireless communication, at shopping malls, office complexes, military installations, onboard a ship at sea or an airplane in flight above a specific altitude, for example. Because only registered devices 20 can communicate over the local wireless network 10, security may be enhanced, and unauthorized wireless communications prevented while the underlying macro wireless network 70 continues to function as normal.

Figure 5:
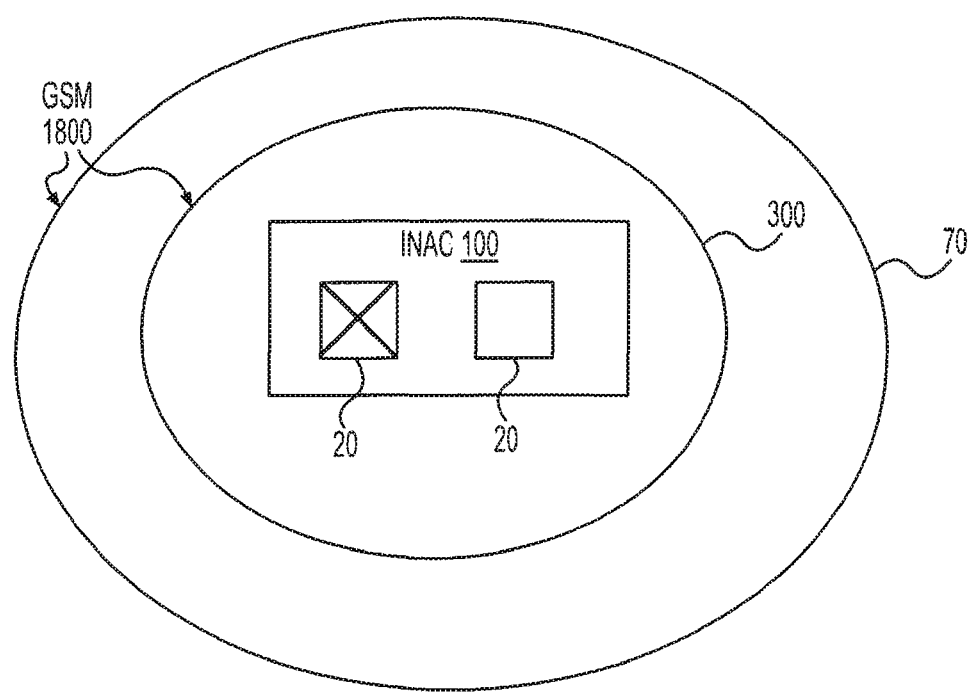
FIG. 5 illustrates a single technology implementation of the controller of FIG. 1B.
Figure 6:
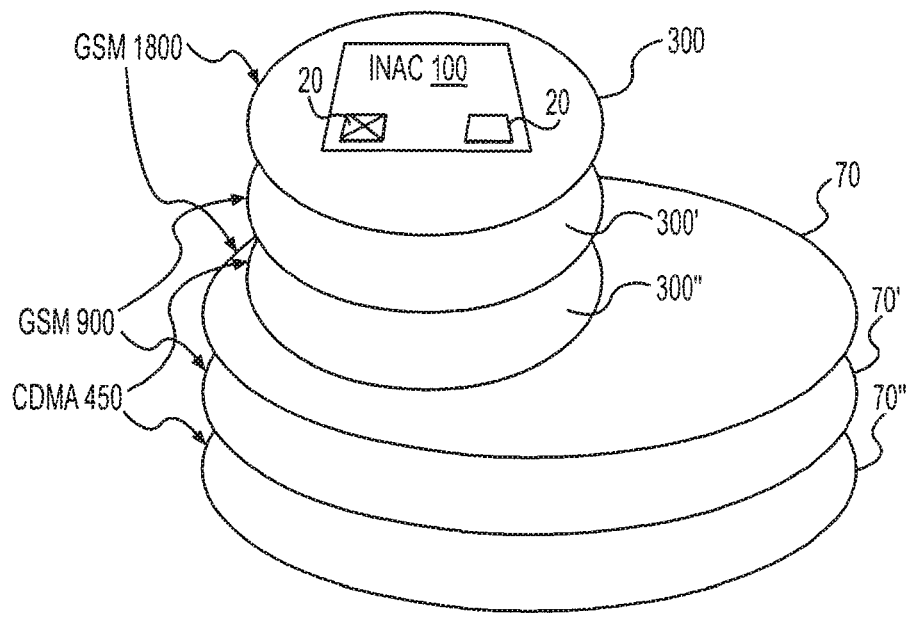
FIG. 6 illustrates a multiple technology implementation of the controller of FIG. 1B.

As noted above, the INAC 100 may be used to control wireless access for one wireless technology, and/or for one frequency range, or for multiple technologies and frequency ranges. FIGS. 5 and 6 show this functionality, with examples of current wireless protocols illustrated. One skilled in the art will appreciate that other protocols would apply equally, including wireless protocols to be developed in the future. In FIG. 5, the INAC 100 is used to create restricted wireless access area 300 as an overlay to the macro wireless network 70, where the network 70 and the restricted access area 300 are based on GSM 1800 protocols. In FIG. 6, three wireless technologies are shown and, correspondingly, three restricted access areas (300, 300', 300"). In a further alternative, the INAC 100 may be used to create restricted access areas for only a subset of the protocols of a multi-protocol wireless network.

Figure 7A:
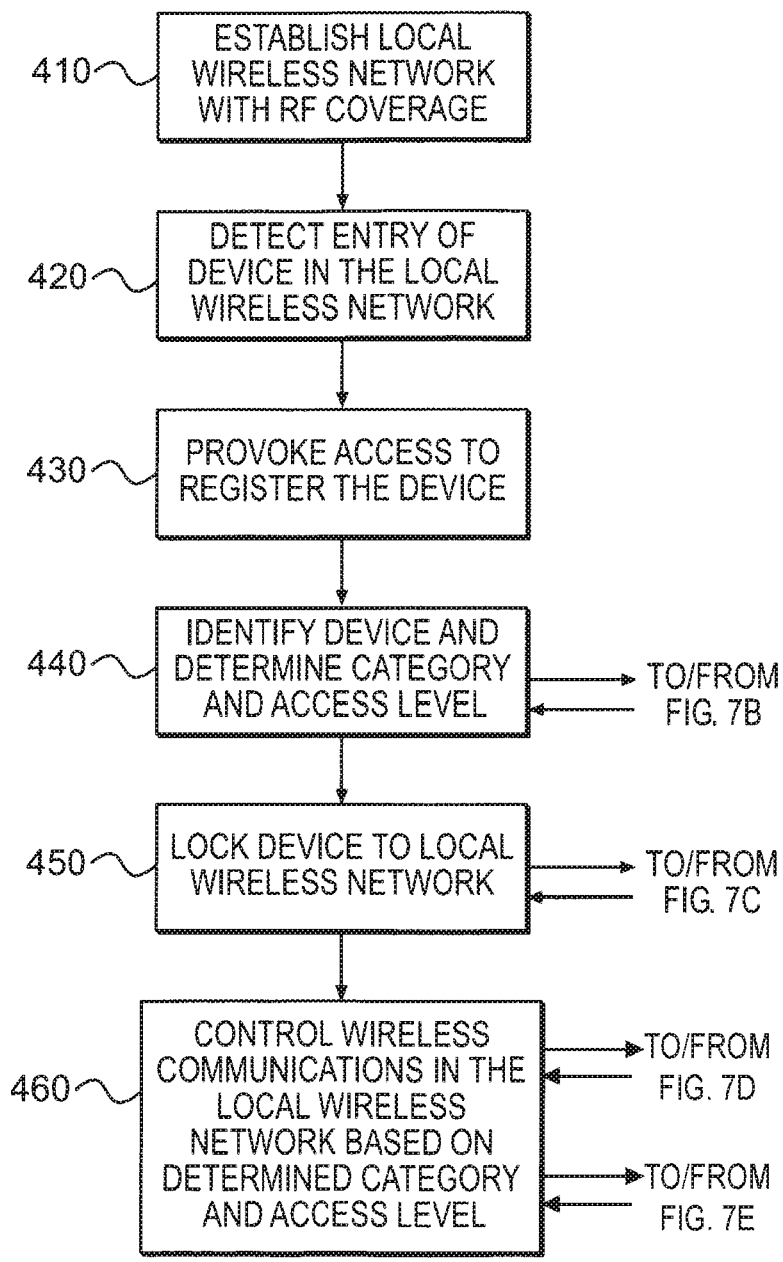
FIGS. 7A-7G are flowcharts illustrating example methods for intelligent network access control.

FIGS. 7A-7G illustrate example methods for intelligent network access control. Method 400 involves creating a local wireless network and for dynamically controlling wireless communications. In FIG. 7A, method 400 begins in block 410 when a local wireless communications network 300 (see FIG. 5) is established having a defined RF coverage area. Following establishment of the local wireless network 300, wireless devices 20 may enter the RF coverage area corresponding to the local wireless network 300. In block 420, the INAC 100 detects entry of a wireless device 20 into the RF coverage area. Techniques for detecting such entry are well-known to those skilled in the art. In block 430, if the wireless device 20 has not already initiated registration with the INAC 100, the INAC 100 send the first part of a handshake message, as is known in the art, to provoke such registration. The INAC 100 may use other techniques to provoke such registration. In block 440, following registration of the wireless device 20, the INAC 100 identifies the wireless device 20 and dynamically determines the characteristics of the wireless device 20 and, if necessary, the characteristics of the RF coverage area of the local wireless network 300. The process of block 440 is shown in detail in FIG. 7B.

Figure 7B:
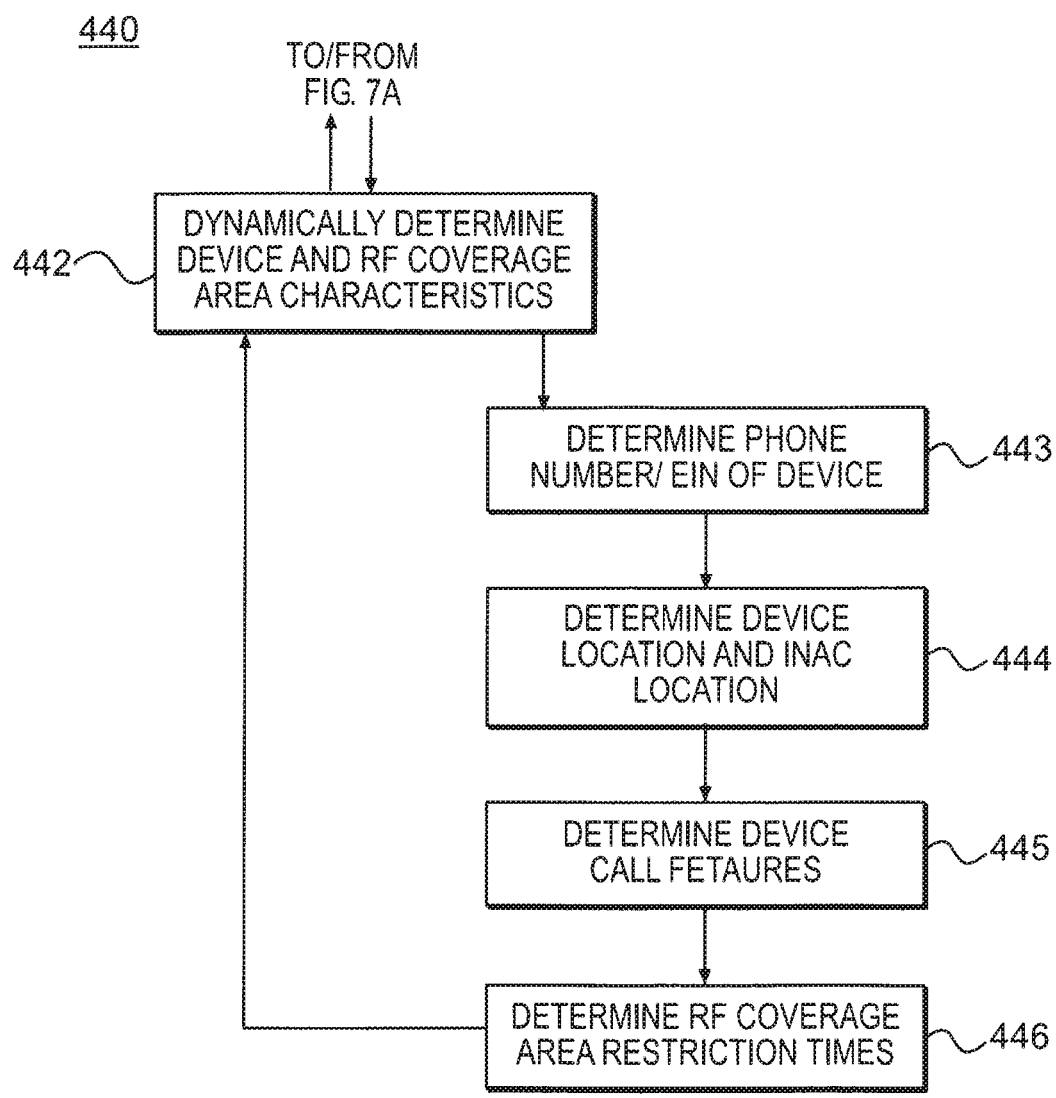

In FIG. 7B, in block 442, the INAC 100 dynamically determines the device 20 characteristics and the RF coverage area characteristics. The wireless device 20 characteristics may be tied to a phone number of the wireless device 20 subscriber number (wireless phone number), or other identifying information. Wireless devices 20 may be categorized or characterized as known to the INAC 100, unknown to the INAC 100, or restricted (e.g., belonging to a known terrorist). The RF characteristics of the local wireless network 300 may change with time and space. That is, for example, certain areas of the local wireless network 300 may be used to allow wireless communications for any of the wireless devices 20, or a subset of the wireless devices; in other areas, no wireless communications may be allowed. An example of such an access-limited RF coverage area is one established for an Embassy or a prison. In addition, the local wireless network 300 may limit wireless communications based on date or time of day, for example. Dynamically determining device characteristics includes determining the phone number and/or EIN of the device 20 (see block 443); determining device 20 location relative to the INAC 100 location (see block 444); and determining device 20 call features (block 445). To determine RF coverage area characteristics, the INAC 100 determines, inter alia, RF coverage area restrictions (see block 446). Following block 446, the method 400 returns to block 442 and then returns to block 440 (FIG. 7A). Following block 440, method 400 moves to block 450.

Figure 7C:
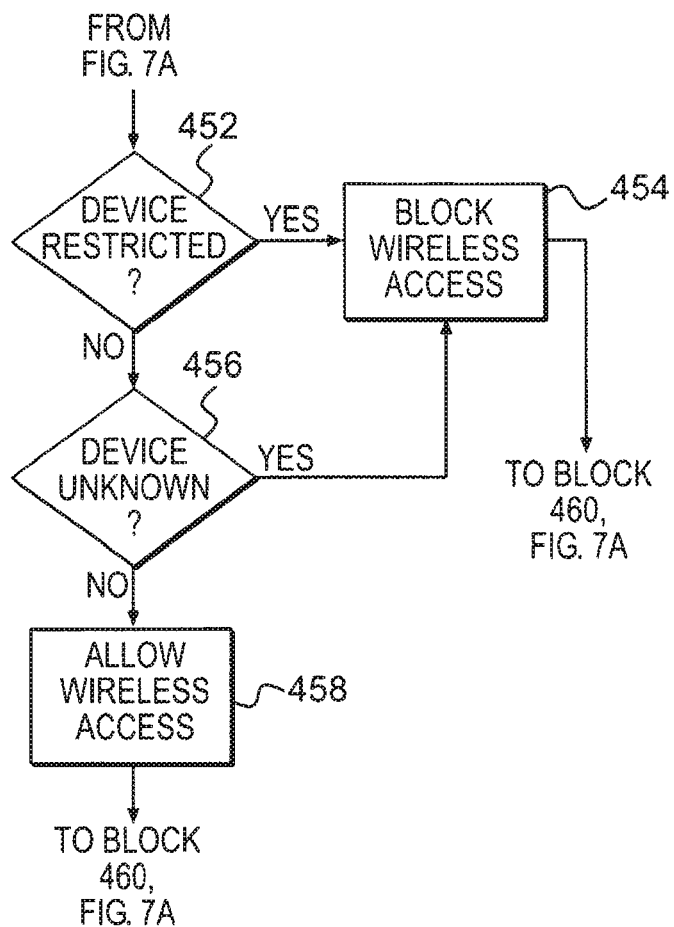

In block 450, the INAC 100 initially locks all wireless devices 20 (restricted, allowed, and unknown) to the INAC 100, and consequently to the local wireless network 300, thereby inhibiting wireless access to the macro wireless network 70, and subsequently may redirect certain devices 20 to the macro wireless network 70. FIG. 7C shows a portion of the operation of block 450 in detail. In FIG. 7C, with all devices 20 locked to the INAC 100, in block 452 the INAC 100 determines if the device 20 is restricted. If, in block 453 the device 20 is determined to be restricted, the method 400 moves to block 454. If the device is not restricted, the method 400 moves to block 456 and the INAC 100 determines if the device is unknown. If the device 20 is unknown, the method moves to block 454. If the device 20 is not unknown, the method 400 moves to block 458, and the INAC 100 allows the wireless device 20 access to the macro wireless network 70. In block 454, the INAC 100 continues to block access of the restricted and unknown wireless devices 20 to the macro network 70. Following blocks 454 and 458, the method moves to block 460, FIG. 7A.

Figure 7D:
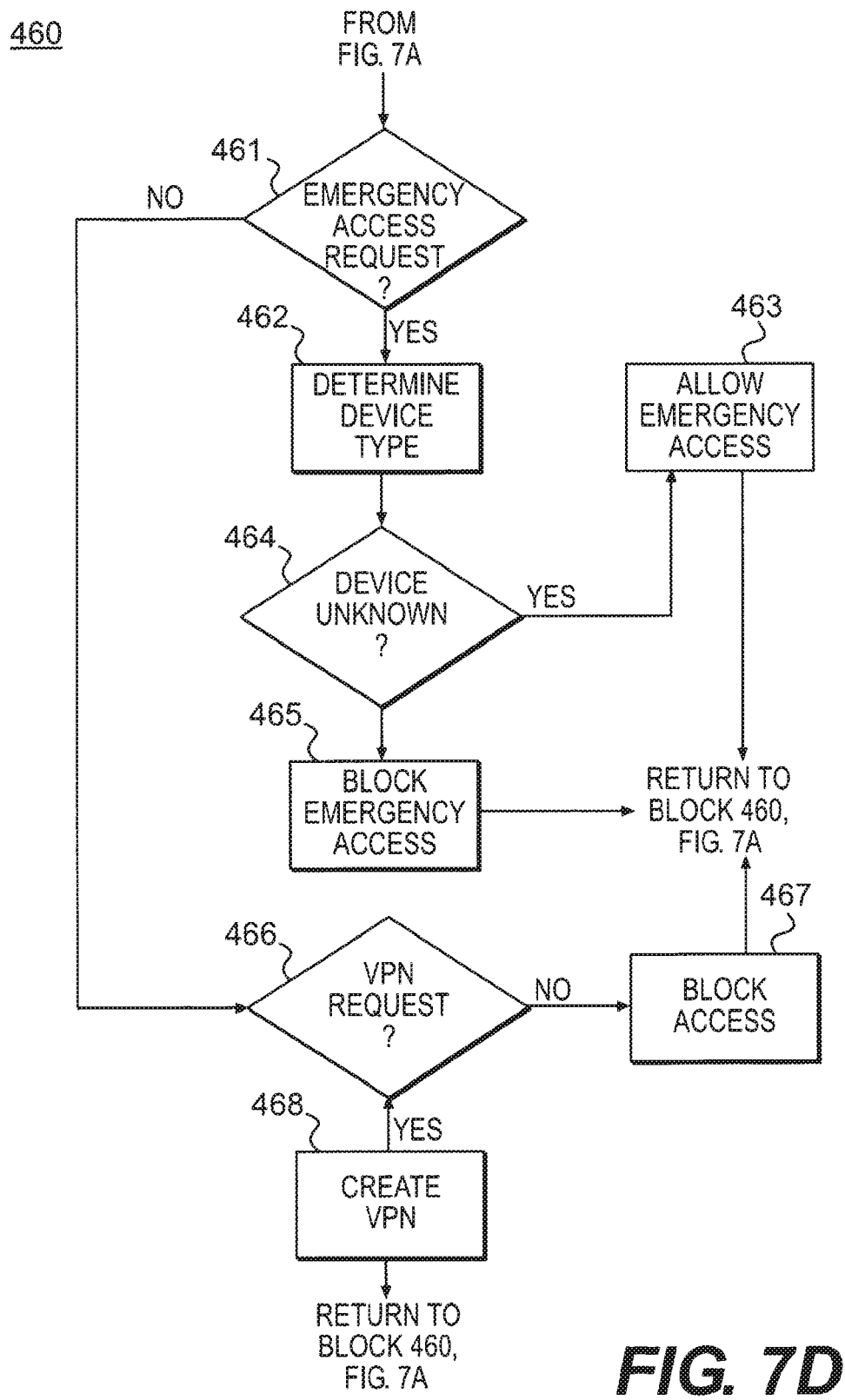

Once a device 20 is locked to the INAC 100, the INAC 100 may allow wireless communications for some or all such locked wireless devices 20, based on the dynamically determined characteristics of a particular wireless device 20, in conjunction with the RF coverage area characteristics, and under certain circumstances, such as an attempted emergency call access. Details of an aspect of this process of block 460 are shown in FIG. 7D, in which a device 20 attempts a call to the macro network 70. In block 461, the INAC 100 determines if the attempted call is an emergency call access request. If the access request is not an emergency call access request, the method 400 moves to block 466. If the access request is an emergency call access request, the method 400 moves to block 462, and the INAC 100 determines the device category (i.e., restricted or unknown). In block 464, if the device is unknown, the method 400 moves to block 463 and the INAC 100 allows emergency access and redirects the device 20 to the macro network 70. If the device 20 is not unknown (meaning the device 20 is restricted), the method 400 moves to block 465 and the INAC 100 blocks emergency call access through the macro wireless network 70. In block 466, the INAC 100 determines if the attempted call is a request to create a virtual private network. If the attempted access is not a request to create a virtual private network, the method 400 moves to block 467 and the INAC 100 continues to block access to the macro wireless network 70. If the attempted call is a virtual private network request, the method 400 moves to block 468 and the INAC 100 creates a virtual private network. Following any of blocks 463, 467, and 468, the method 400 returns to block 460 (FIG. 7A) and the INAC continues to control access of the devices 20 to the macro wireless network 70.

Figure 7E:
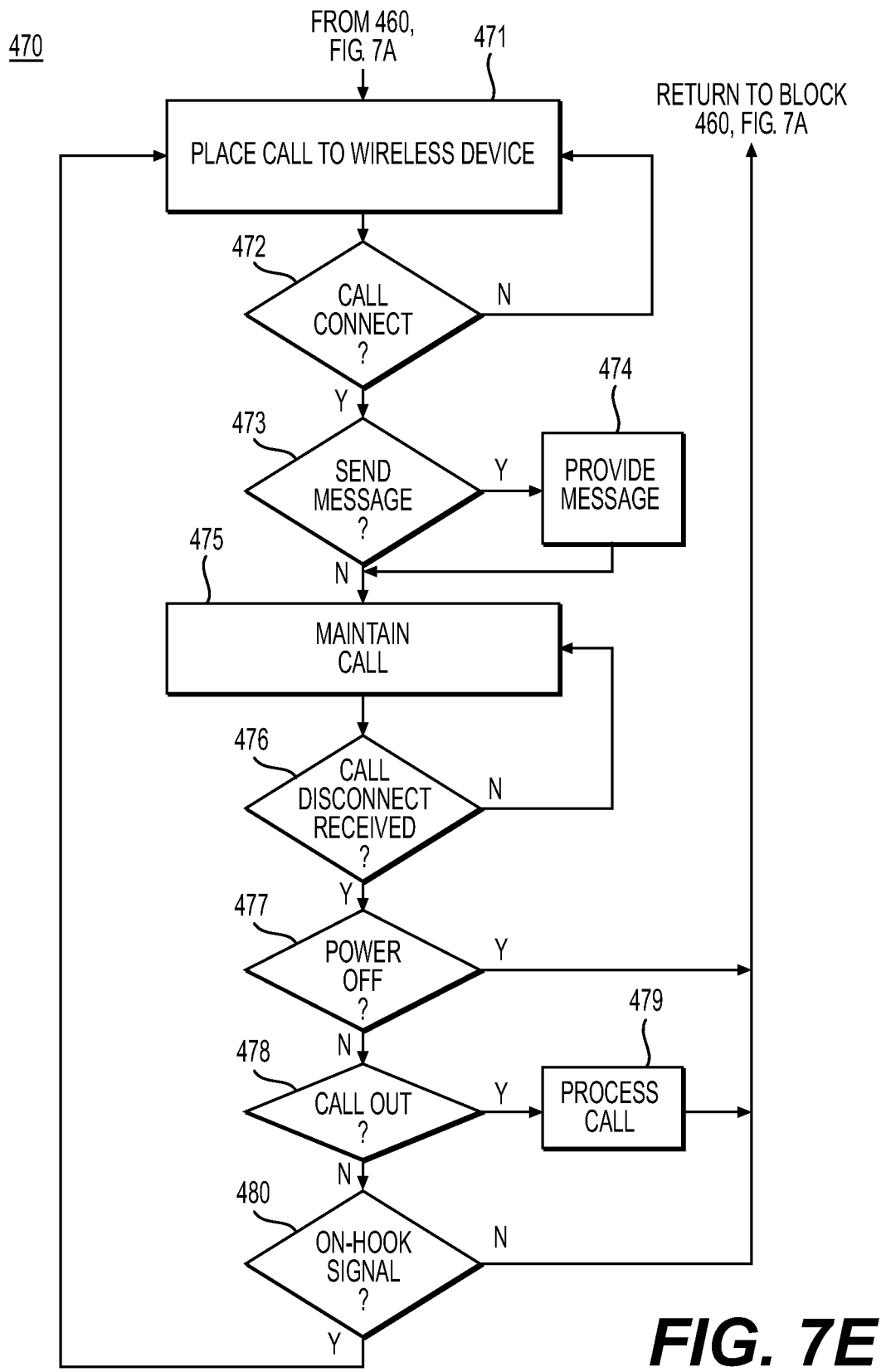

FIG. 7E illustrates another intelligent network access control method (method 470) that involves generating a persistent annoyance signal that effectively monopolizes or takes over a wireless device 20 operating in the coverage area of the local wireless network generated by the INAC 100. In FIG. 7E, persistence system 190 of the INAC 100 (see FIG. 1B) executes to engage wireless device 20 in a manner that effectively prevents use of the device by its operator. The persistence system 190 may operate with respect to wireless devices 20 that are powered on and otherwise operating within the coverage area of local wireless network 10 (see FIG. 1A). In an aspect of the method 470, such wireless devices 20 may have been compelled by execution of other systems and components of the INAC 100 to register with the INAC 100, and may be locked to the INAC 100. In another aspect of the method 470, the wireless device 20 may be identified by the INAC 100 but may be allowed to operate within the underlying macro wireless network 70 (see FIG. 1A). Because a wireless device 20, whether or not locked to the INAC 100, is known to the INAC 100, the persistence system 190 may execute to place a "call," block 471, to the wireless device 20. As a person skilled in the art would realize, such a "call" may include voice communications but also may include data communications and text communications. For example, if the wireless device 20 is a contraband cell phone, the persistence system 190 may initiate a voice call to the wireless device 20.

In block 472, the persistence system 190 executes to determine if the call to the wireless device 20 establishes a connection. As an aspect of block 472 for a voice call, the system 190 may determine that the voice call is answered. As another aspect of block 472 for a voice call, the system 190 may determine that a human user answers the voice call or, alternately, that the voice call is received by an answering service. If, however, a persistent (for example, a configurable number of seconds) ringing occurs, a busy signal is received, or no signal is returned from the wireless device 20, the method 470 may return to block 471, and the persistence system 190 may initiate another voice call. In an embodiment, the voice call may be placed by the persistence system 190 without providing any means for identifying the calling system. For example, the persistence system 190 may not provide an originating calling number or may provide a fake number for display at the wireless device 20. Following establishment of a connection, the operation 470 moves to block 473, and the system 190 determines if a message is to be sent to the wireless device 20. For example, if the human user answers the call, the system 190 may play (provide) a message indicating that the user's device 20 is unknown and is being blocked, and providing a mechanism the user may follow to unblock the device 20. Other messages are possible. If the call is answered by a voice message application at the device 20, similar messages may be provided. Alternately, the system 190 may execute to determine no message is to be provided. Accordingly, following block 473, the operation 470 moves to either block 474 or 475.

In block 475, the system 190 maintains the call until, as is shown in block 476, the system 190 determines if a call disconnect signal is detected. If a call disconnect signal is not detected, the operation returns to block 475 and the call is maintained. If a call disconnect signal is received, the operation 470 moves to block 477 and the system 190 determines if the call disconnect signal is because the device 20 is powered off. The device 20 may be powered off because of an action by the human user or because the device 20 has lost battery power, for example. If the device 20 is powered off, the operation 470 returns to block 471. If the device 20 is not powered off, the operation 470 determines if the human user has initiated an outgoing call. For example, the human user may place a call in response to the message of block 474. If the human user has placed an outgoing call, the operation 470 moves to block 479 and the system 190 permits the outgoing call to be processed. Following block 479, the operation 470 returns to block 460 of FIG. 7A. If the human user has not placed an outgoing call, the operation 470 moves to block 480, and the system 190 determines if the device 20 has provided a call ended signal (an "on-hook" signal. If the call ended signal is not received, the operation 470 returns to block 471. If the call ended signal has been received, the operation 470 returns to block 460, FIG. 7A.

Figure 7F:
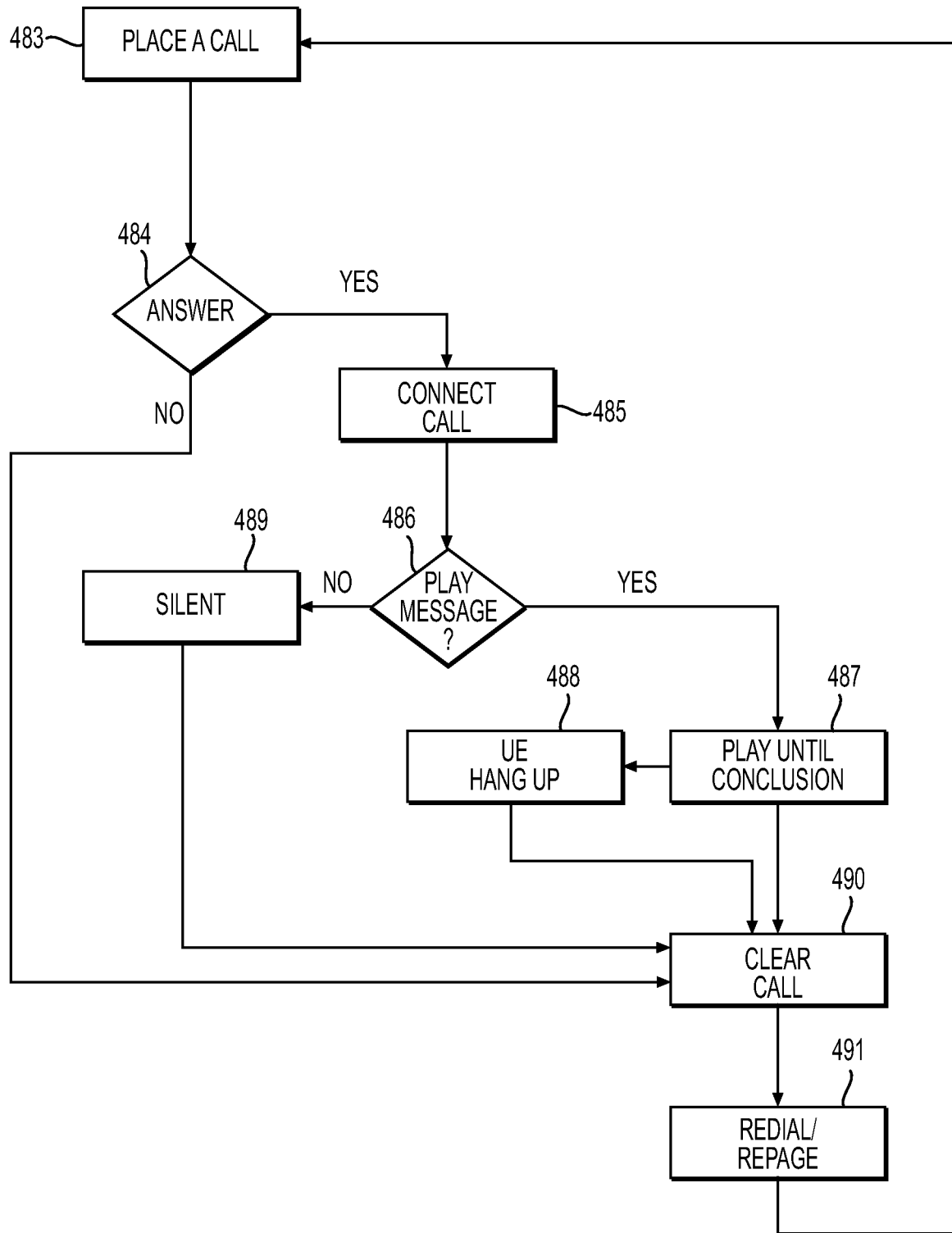

FIG. 7F still another example operation of the INAC 100. In FIG. 7F, communication control operation 482 begins in block 483 when the persistence system 190 places a call to a wireless device operating in a local network overly 10 to an existing wireless network 70 (see FIG. 1A). The call may be a voice call. The call also may be a text message or data.

In block 484, the system 190 determines if the call has been answered. If the call was not answered, the operation 482 moves to block 490 and the call is cleared. If the call was answered (e.g., the human user of the device 20 operates the device 20 to connect to an incoming voice call, selects an incoming text message (SMS) to view, or accesses an incoming data file), in block 485, the system 190 connects the call. In block 486, the system 190 plays a message (yes) or remains silent (no). If a message is not played (block 489), operation 482 moves to block 490. If a message is played, operation 482 moves to block 487, and the message is played to conclusion unless the human user hangs up (terminates the call), block 488. Following either block 487 or 488, the operation 482 moves to block 490, where the call is cleared. Following block 490, operation 482 moves to block 491, and the system 190 repeats the call process (redial or repage).

Figure 7G:
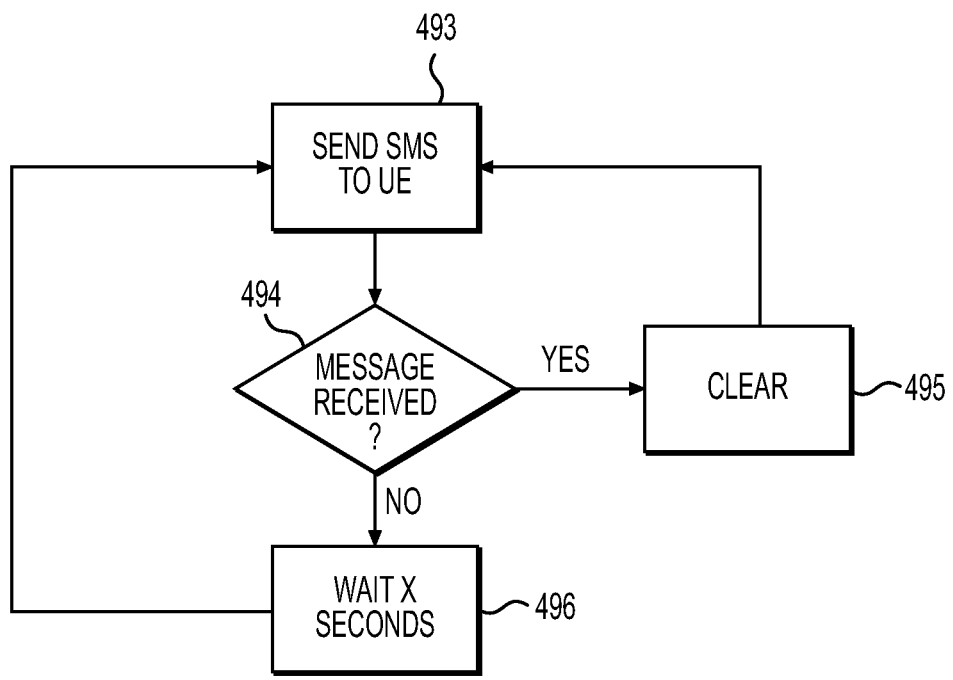

FIG. 7G illustrates a further example of operation of the INAC 100 and the persistence system 190 when communicating with user equipment (UE) (i.e., wireless device 20) using a text message (SMS) or similar communication. In FIG. 7G, operation 492 begins in block 493 when the system 190 sends an SMS message to a wireless device 20. In block 494, the system 190 determines if the wireless device 20 has received the text message. If the wireless device received the SMS message, the operation 492 moves to block 495, the message is cleared, the operation 492 returns to block 493 and the message operation 492 repeats. In block 494 determines the message has not been received, the operation 492 moves to block 496, is paused for a number (X) of seconds, and the operation 492 returns to block 493.

Figure 8A:
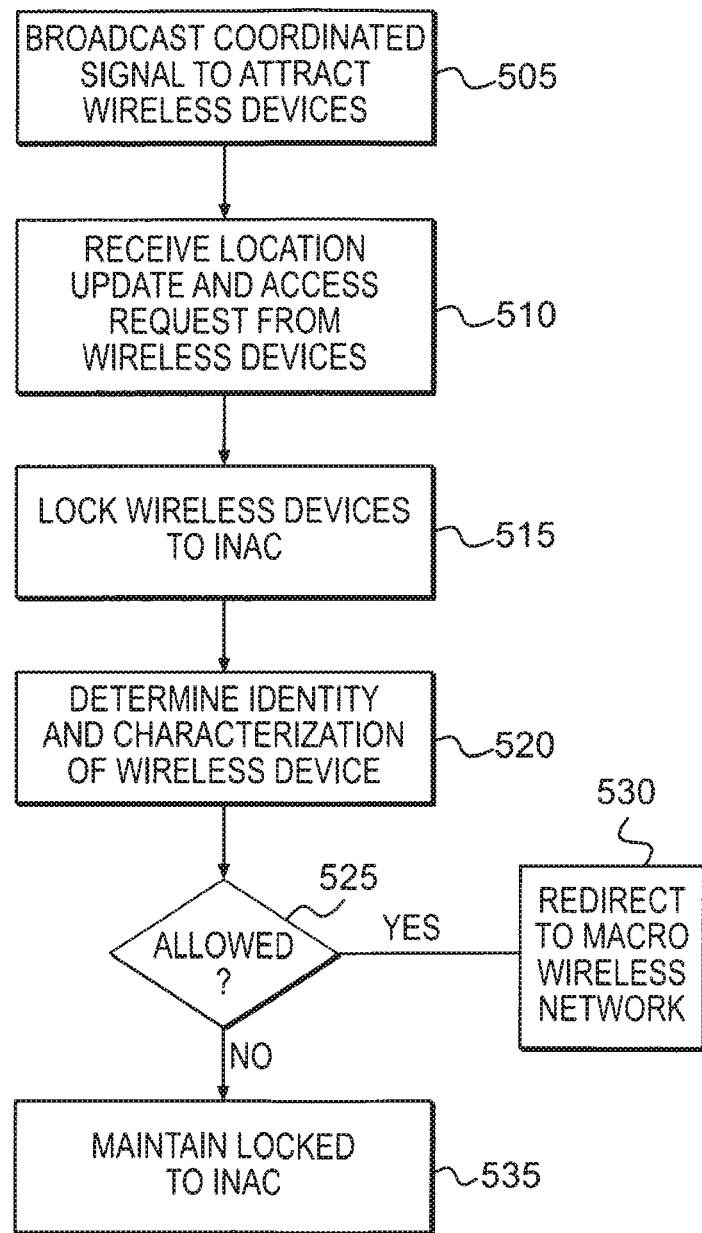
FIGS. 8A-8F are flowcharts illustrating additional example methods for intelligent network access control.

FIGS. 8A-8F illustrate yet another example intelligent network access control method that involves creating a local wireless network and for dynamically controlling wireless communications using the local wireless network. In FIG. 8A, a 2G or 3G wireless device 20 enters the coverage area of a local wireless network 10. In an example method 500, the INAC 100 broadcasts, block 505, a coordinated signal to attract wireless devices. The broadcast signal mimics a corresponding signal from the macro wireless network 70, but may have a stronger signal strength. The 2G/3G wireless device 20 receives the broadcast signal from the INAC 100 and responds with a location update and access request, which the INAC receives, block 510. In block 515, the INAC 100 locks the wireless device 20 to the INAC 100. In block 520, the INAC determines an identity of the wireless device 20. The INAC 100 then determines the characterization (i.e., allowed, unknown, restricted) of the wireless device 20. For example, the INAC 100 may use the device identity to find its characterization as listed in the database 103 of FIG. 1A. In block 525, the INAC 100 determines if the device 20 is allowed. If the device 20 is allowed, the method 500 moves to block 530, and the INAC 100 permits the device 20 to re-attempt access to the macro wireless network 70. If the device is not allowed, the method moves to block 535 and the device 20 is maintained in a locked condition.

Figure 8B:
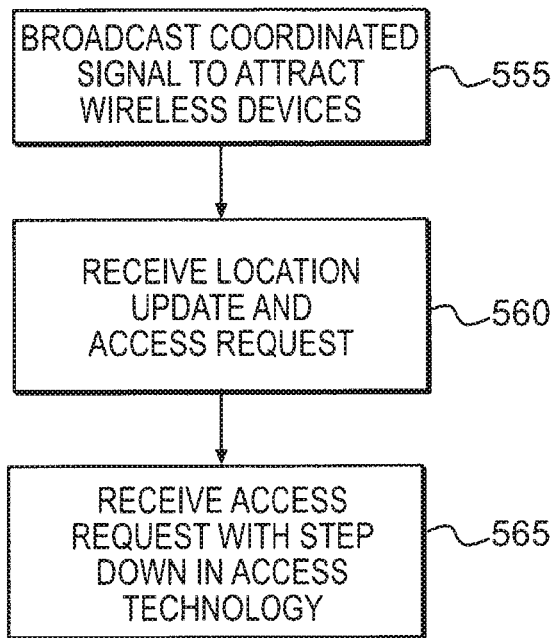

FIG. 8B illustrates example method 550 in which a wireless device 20 operating with a later generation access technology (3G or 4G) is controlled by the INAC 100. In block 555, the INAC 100 broadcasts a coordinated signal to attract wireless devices. In block 560, after a wireless device has intercepted the broadcast signal, the INAC 100 receives a location update and access request from the wireless device 20. However, the INAC 100 does not respond to the access request. When the device 20 does not receive an acknowledgement, the device 20 steps down its access technology to the next lower access technology (e.g., 3G step down to 2G). In block 565, the INAC 100 receives an access request with the step down in access technology. Processing of the device 20 then proceeds as shown in FIG. 8A.

Figure 8C:
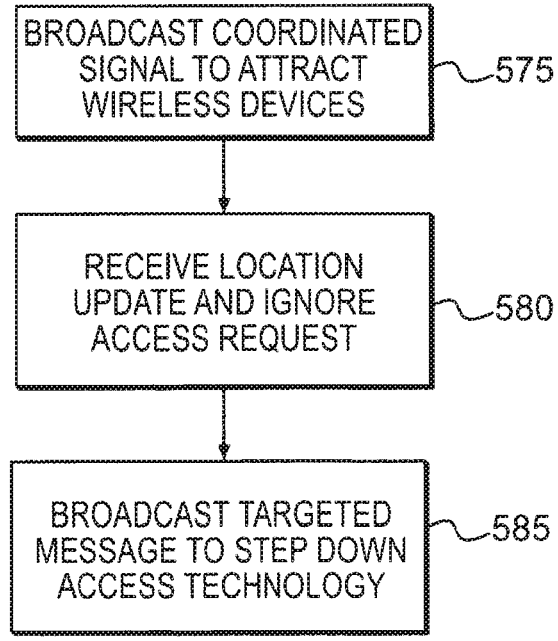

FIG. 8C illustrates example method 570 in which a wireless device 20 operating with a later generation access technology (3G or 4G) is controlled by the INAC 100. In block 575, the INAC 100 broadcasts a coordinated signal to attract wireless devices. In block 580, the INAC 100 receives a location update and access request from wireless device 20. In response, the INAC 100 broadcasts a targeted message to the wireless device 20 to step down its access technology. Processing of the device 20 then proceeds as shown in FIG. 8A.

Figure 8D:
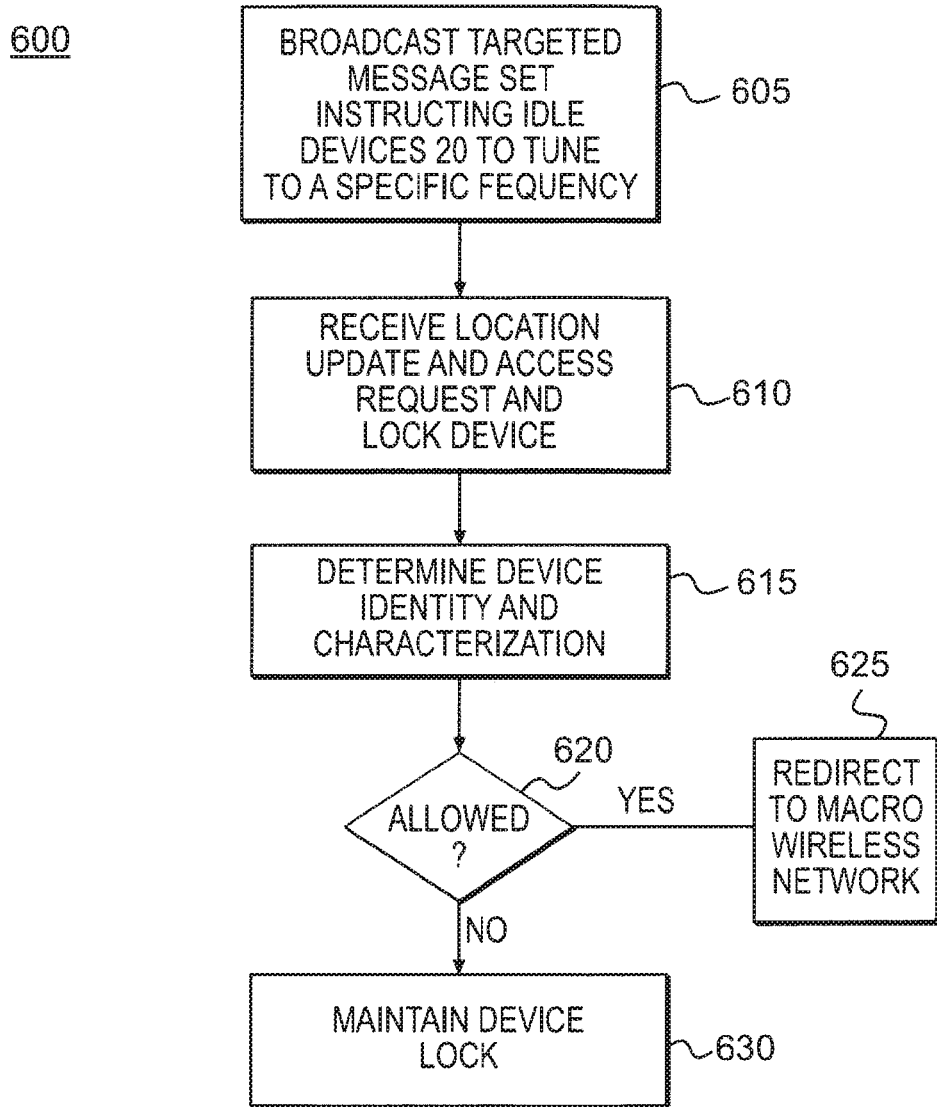

FIG. 8D illustrates example method 600 in which a wireless device 20 is idle on one of multiple CDMA channels when the device 20 enters the local wireless network 10.

In block 605, the INAC 100 broadcasts targeted message sets to CDMA devices 20 directing idle devices to tune to a specified CDMA frequency. In block 610, the INAC 100 receives a location update and access request, and locks the CDMA-based device 20 to the INAC 100. In block 615, the INAC 100 determines an identity and characterization of the device 20. In block 620, the INAC 100 determines if the device 20 is allowed. If the device 20 is allowed, then in block 625, the INAC permits the device 20 to attempt to access the macro wireless network 70. However, if the device is not allowed, then in block 630, the INAC 100 maintains the device 20 locked.

Figure 8E:
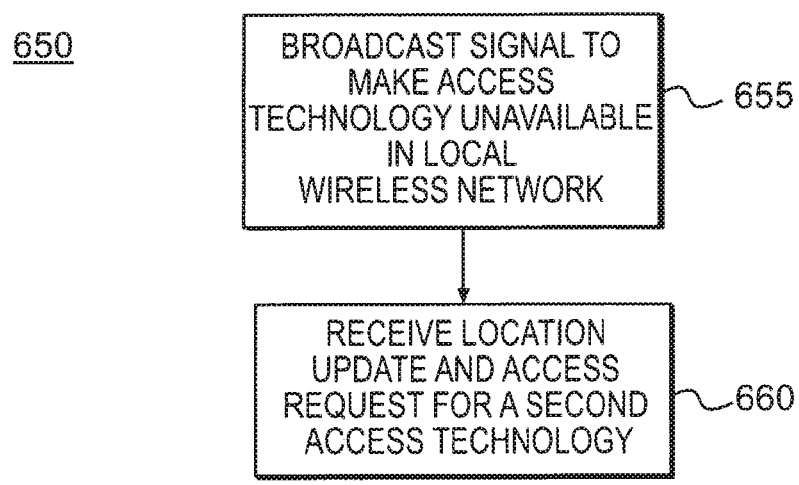

FIG. 8E illustrates example method 650 in which a device 20 operates according to a specific access technology. In block 655, the INAC 100 broadcasts a signal indicating that the specific access technology of the device 20 is not available in the local wireless network. In block 660, the INAC 100 receives a location update (if not already received) and an access request from the device 20 for a second access technology.

Figure 8F:
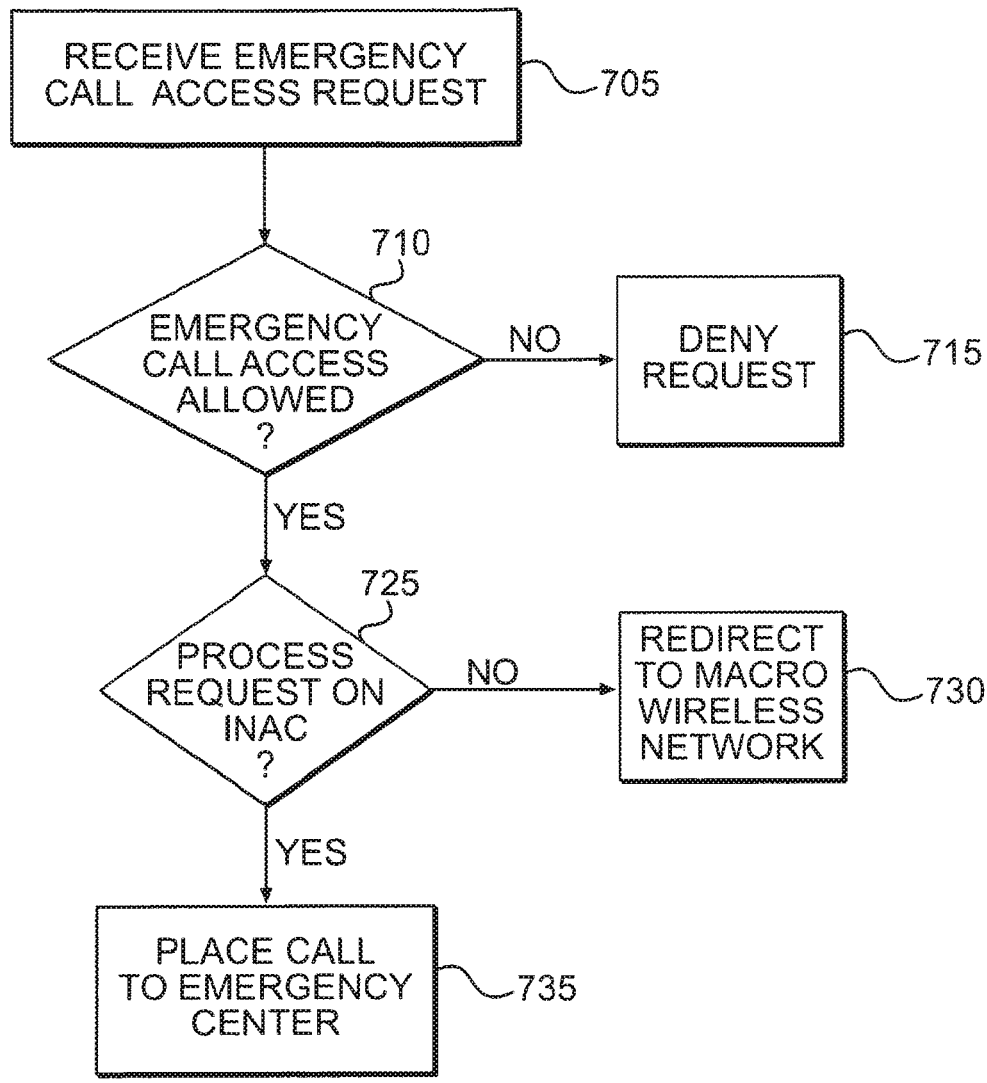

FIG. 8F illustrates a method 700 for placing an emergency call. Method 700 begins in block 705 when the INAC 100 receives an emergency call access request, for example, to place a 911 call, from a wireless device that is locked to the INAC 100. In block 710, the INAC 100 determines if emergency call access is allowed. If emergency call access is not allowed, the method 700 moves to block 715 and the INAC 100 denies the emergency call access request. The INAC 100 may deny the request based on a characterization of a specific wireless device. For example, the INAC 100 may deny an emergency call access request from a restricted wireless device 20. Alternately, the INAC may deny all emergency call access requests. In block 710, if emergency calls are allowed, the method 700 moves to block 725 and the INAC determines if the emergency call access request will be processed on the INAC 100. If the request will not be processed on the INAC 100, the method 700 moves to block 730 and the INAC 100 redirects the wireless device to the macro wireless network 70. If in block 725, the INAC 100 determines the request will be processed on the INAC 100, the method 700 moves to block 735. In block 735, the INAC allows the wireless device 20 to place an emergency call to an emergency call center.

The preceding disclosure refers to flow charts and accompanying description to illustrate the embodiments represented in FIGS. 7A-8F. The disclosed devices, components, and systems contemplate using or implementing any suitable technique for performing the steps illustrated. Thus, FIGS. 7A-8F are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

I claim:

1. A method for controlling communications traffic for wireless devices operating in a coverage area, defined by a coverage area boundary, of a local wireless network that overlays a portion of a macro wireless network, the local wireless network established by operation of an intelligent network access controller in cooperation with the macro wireless network and in communication with wireless communications hardware including radiofrequency (RF) distribution equipment, an RF antenna, an amplifier, and a base station; the controller connected to the base station, the method comprising the controller:

generating and managing the local wireless network; and
controlling the RF distribution equipment to establish persistent, repetitive inbound communications to the wireless devices, comprising:
identifying wireless devices within the coverage area boundary and wireless devices outside the coverage area boundary and within RF range of the RF antenna,
placing a first call to a wireless device within the coverage area boundary, receiving a first answer from the wireless device,
establishing a first connection with the wireless device,
sending a first message to the wireless device,
receiving and processing a first response from the wireless device,
initiating a first call clearance, and
repeating a call function of placing a call, receiving an answer, establishing a connection, sending a message, receiving and processing a response from the wireless device, and initiating a call clearance while the wireless device is powered on.

2. The method of claim 1, wherein the first call is a voice call and the first message is a voice message.

3. The method of claim 1, wherein the first call is a voice call and the first answer is a human voice return.

4. The method of claim 1, wherein the first call is a text (SMS) message, the first answer is a text message, and the first message is a text message.

5. The method of claim 1, wherein the first call is a data communication and the first answer is a voice call.

6. The method of claim 1, wherein the controller repeats the call function until the wireless device attempts to place an outgoing call.

7. The method of claim 1, wherein the first response is a disconnection action initiated by the wireless device, and wherein the controller reinitiates the call function.

8. The method of claim 1, wherein the controller:
receives a location the wireless device;
determines the wireless device is within the coverage area boundary;
compels the wireless device to register with the local wireless network;
completes a registration process with the wireless device;
identifies the wireless device as one of unknown and restricted; and
locks the wireless device to the local wireless network.

9. The method of claim 1, wherein the controller:
receives a location the wireless device;
determines the wireless device is within RF range of the coverage area boundary;
compels the wireless device to register with the local wireless network;
completes a registration process with the wireless device;
identifies the wireless device as one of unknown and restricted; and
locks the wireless device to the local wireless network.

10. The method of claim 1, wherein the controller:
receives a location the wireless device;
determines the wireless device is within RF range of the coverage area boundary;
compels the wireless device to register with the local wireless network;
completes a registration process with the wireless device;
identifies the wireless device as allowed; and
prompts the wireless device to attempt registration with the macro wireless network.

11. A system for controlling wireless communications in a restricted volume of a wireless communications network, comprising:
a non-transitory, computer-readable storage medium having encoded thereon, machine instructions that when executed by an intelligent network access controller cause the controller to control radio frequency (RF) components including an RF transmitter/receiver, and amplifier, and RF antennae to:
establish the restricted volume as an overlay to a portion of a macro wireless network,
compel wireless devices in the restricted volume of the local wireless network to attempt to register with the controller,
receive a registration attempt from a first wireless device and a second wireless device, and
for the first wireless device:
prompt the first wireless device to register with the macro wireless network;
place a first call to the first wireless device;
receive a first answer from the first wireless device;
establish a first connection with the first wireless device;
send a first message to the first wireless device;
receive and process a first response from the first wireless device;
initiate a first call clearance; and
repeat, for a configurable number of times, a call function of placing a call, receiving an answer, establishing a connection, sending a message, receiving and processing a response from the wireless device, and initiating a call clearance.

12. The system of claim 11, wherein the controller receives a second registration attempt from a second wireless device, and wherein the controller controls the RF distribution equipment to:
identify the second wireless device as one of unknown and unauthorized;
lock the second wireless device to the controller;
place a second call to the second wireless device;
receive a second answer from the second wireless device;
establish a second connection with the second wireless device;
send a second message to the second wireless device;
receive and process a second response from the second wireless device;
initiate a second call clearance; and
repeat a call function of placing a call, receiving an answer, establishing a connection, sending a message, receiving and processing a response from the second wireless device, and initiating a call clearance until the second wireless device powers off.

13. The system of claim 11, wherein the controller provides a 24-hour mapping of an activity period for voice call, SMS message, and data connection initiation.

14. The system of claim 11, wherein the controller determines a frequency of the initiation of the call function.

15. The system of claim 11, wherein repetition of the call function terminates when an operation of the first wireless device, in response to a message sent from the RF components, places an outgoing call with the macro wireless network.

16. A system for controlling wireless communications by wireless devices in a restricted environment, comprising:
a non-transitory, computer-readable storage medium having encoded thereon, machine instructions that when executed by a controller, cause the controller to control RF distribution equipment, including a wireless base station and RF distribution equipment including an RF transmitter/receiver, and amplifier, and RF antennae to:
identify the wireless devices as one of allowed, restricted and unknown, and
for restricted and unknown wireless devices:
control the RF distribution equipment to establish persistent, repetitive inbound communications to the wireless devices, comprising:
place a first call to a wireless device,
receive a first answer from the wireless device, establish a first connection with the wireless device, send a first message to the wireless device, receive and process a first response from the wireless device, initiate a first call clearance, and repeat a call function of placing a call, receiving an answer, establishing a connection, sending a message, receiving and processing a response from the first wireless device, and initiating a call clearance until the wireless device powers off.

17. The system of claim 16, wherein:

the controller controls the RF distribution equipment to establish a local wireless network as an overlay to a portion of a macro wireless network;

the wireless device is within a coverage area of the local wireless network;

the wireless device is compelled to attempt to register with the controller; and the wireless device is locked to the controller.

18. The system of claim 16, wherein allowed wireless devices are prompted to register with the macro wireless network.

19. The system of claim 18, wherein:

the controller receives a location of the wireless device as within a coverage area of the local wireless network, and the controller initiates the persistent repetitive inbound communications.

20. The system of claim 16, wherein the call is a voice call and the answer is an answering machine answer.

21. The system of claim 16, wherein the call is a voice call and the answer is a human operator answer.

22. The system of claim 16, wherein the coverage area of the local wireless network is non-static.

* * * * *